(12) United States Patent
Mani et al.

(10) Patent No.: US 11,513,627 B2
(45) Date of Patent: Nov. 29, 2022

(54) ASSISTIVE DEVICE WITH A REFRESHABLE HAPTIC FEEDBACK INTERFACE

(71) Applicants: Niki Mani, La Jolla, CA (US); Alex Hamid Mani, LaJolla, CA (US)

(72) Inventors: Niki Mani, La Jolla, CA (US); Alex Hamid Mani, LaJolla, CA (US)

( * ) Notice: Subject to any disclaimer, the term of this patent is extended or adjusted under 35 U.S.C. 154(b) by 0 days.

(21) Appl. No.: 17/496,662

(22) Filed: Oct. 7, 2021

(65) Prior Publication Data

US 2022/0027008 A1  Jan. 27, 2022

Related U.S. Application Data

(63) Continuation-in-part of application No. 17/124,563, filed on Dec. 17, 2020, now Pat. No. 11,353,984, which is a continuation of application No. 16/854,987, filed on Apr. 22, 2020, now Pat. No. 10,884,544, which is a continuation of application No. 16/297,960, filed on Mar. 11, 2019, now Pat. No. 10,747,359, which is a continuation of application No. 15/709,882, filed on Sep. 20, 2017, now Pat. No. 10,275,083.

(51) Int. Cl.
*G06F 3/041* (2006.01)
*G06F 3/01* (2006.01)

(52) U.S. Cl.
CPC ............ *G06F 3/0416* (2013.01); *G06F 3/016* (2013.01)

(58) Field of Classification Search
None
See application file for complete search history.

(56) References Cited

U.S. PATENT DOCUMENTS

| | | |
|---|---|---|
| 6,650,338 B1 | 11/2003 | Kolarov et al. |
| 8,754,757 B1 | 6/2014 | Ullrich et al. |
| 9,147,328 B2 | 9/2015 | Ioffreda et al. |
| 9,417,754 B2 | 8/2016 | Smith |
| 9,635,440 B2 | 4/2017 | Lacroix |
| 9,792,501 B1 | 10/2017 | Maheriya et al. |
| 9,919,208 B2 | 3/2018 | Rihn et al. |

(Continued)

OTHER PUBLICATIONS

Corrected Notice of Allowance for U.S. Appl. No. 17/124,563 dated Mar. 23, 2022.

(Continued)

*Primary Examiner* — Nicholas J Lee
(74) *Attorney, Agent, or Firm* — Chip Law Group

(57) ABSTRACT

An assistive device and method to provide non-visual assistance to a user comprises a haptic feedback interface that includes a plurality of haptic elements. The assistive device generates a first touch-discernible output layout on the haptic feedback interface using the plurality of haptic elements. The first touch-discernible output layout corresponds to a first reproduction of a 3D real-world area within a first proximity range of the assistive device and includes a first set of different haptic indicators to discern movement of a first set of moving objects within the first proximity range. The assistive device receives a selection of a first haptic indicator that discerns a target moving object and executes a transition from the first touch-discernible output layout to a second touch-discernible output layout based on a movement of the target moving object from the first proximity range to a second proximity range of the assistive device.

20 Claims, 10 Drawing Sheets

(56) References Cited

U.S. PATENT DOCUMENTS

| | | |
|---|---|---|
| 9,928,701 B2 | 3/2018 | Levesque et al. |
| 9,946,346 B2 | 4/2018 | Kawamura et al. |
| 10,281,983 B2 | 5/2019 | Mani |
| 10,496,176 B2 | 12/2019 | Mani |
| 10,503,310 B2 | 12/2019 | Mani et al. |
| 10,754,429 B2 | 8/2020 | Mani |
| 11,175,740 B2 | 11/2021 | Mani |
| 11,331,938 B1 | 5/2022 | Kaplan et al. |
| 2002/0084996 A1 | 7/2002 | Temkin et al. |
| 2006/0038781 A1 | 2/2006 | Levin |
| 2012/0194420 A1 | 8/2012 | Osterhout et al. |
| 2013/0038792 A1 | 2/2013 | Quigley et al. |
| 2014/0267904 A1 | 9/2014 | Saboune et al. |
| 2015/0302772 A1 | 10/2015 | Yu et al. |
| 2016/0378214 A1 | 12/2016 | Chi et al. |
| 2017/0024010 A1 | 1/2017 | Weinraub |
| 2017/0177085 A1 | 6/2017 | Sun et al. |
| 2017/0236330 A1 | 8/2017 | Seif |
| 2019/0087002 A1 | 3/2019 | Mani |

OTHER PUBLICATIONS

Non-Final Office Action for U.S. Appl. No. 17/037,408 dated Feb. 17, 2022.

Notice of Allowance for U.S. Appl. No. 17/124,563 dated Jan. 3, 2022.

Corrected Notice of Allowance for U.S. Appl. No. 17/124,563 dated May 10, 2022.

Notice of Allowance for U.S. Appl. No. 17/460,460 dated Apr. 20, 2022.

Corrected Notice of Allowance for U.S. Appl. No. 17/460,460 dated Aug. 26, 2022.

Final Office Action for U.S. Appl. No. 17/037,408 dated Sep. 21, 2022.

Non-Final Office Action for U.S. Appl. No. 17/496,682 dated Oct. 6, 2022.

Non-Final Office Action for U.S. Appl. No. 17/716,057 dated Sep. 12, 2022.

ASSISTIVE DEVICE WITH A REFRESHABLE HAPTIC FEEDBACK INTERFACE

CROSS-REFERENCE TO RELATED APPLICATIONS/INCORPORATION BY REFERENCE

This patent application makes reference to, claims priority to, claims the benefit of, and is a Continuation-in-part application of U.S. patent application Ser. No. 17/124,563, filed on Dec. 17, 2020, which is a Continuation Application of U.S. patent Ser. No. 10/884,544, granted Jan. 5, 2021, which is a Continuation Application of U.S. patent Ser. No. 10/747,359, granted Aug. 18, 2020, which is a Continuation Application of U.S. patent Ser. No. 10/275,083, granted Apr. 30, 2019.

FIELD

Various embodiments of the disclosure relate to assistive technologies. More specifically, various embodiments of the disclosure relate to an assistive device with a refreshable haptic feedback interface and a method to provide non-visual assistance to a user by the assistive device.

BACKGROUND

With the growth of human-machine interaction (HMI) and sensor technologies, various types of assistive devices have been developed. However, technological developments in HMI are mostly focused on vision-based interaction technology. Humans have five traditional recognized senses, sight (ophthalmoception), hearing (audioception), taste (gustaoception), smell (olfacoception or olfacception), and touch (tactioception). The loss of one or more senses generally results in enhancement of one or more of the remaining senses to compensate for the lost sense(s). For people that have loss or impaired sight, existing technology are typically focused on Braille-based or other rudimentary forms of tactile presentation systems. As existing technology are typically focused on Braille based tactile presentations or other conventional tactile forms, HMI for people that have loss or impaired sight are usually limited to use of separate input and output interfaces, for example, a separate 6-keys or 8-keys Braille input and a separate rudimentary form of tactile output that are of limited functionality and use. For people that have impaired sight, it may be a challenging task to understand the surrounding world similar to the sighted people using the existing systems. For example, for a person who has loss or impaired sight, it may not be possible to track the movement of a specific object (such as a child, a pet, or the like) in real word similar to how a sighted person would track the movement using existing systems. Thus, an advanced assistive device may be required for providing non-visual assistance to a user for enhanced understanding of the surrounding world.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An assistive device with a refreshable haptic feedback interface and a method for providing non-visual assistance to a user by the assistive device substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
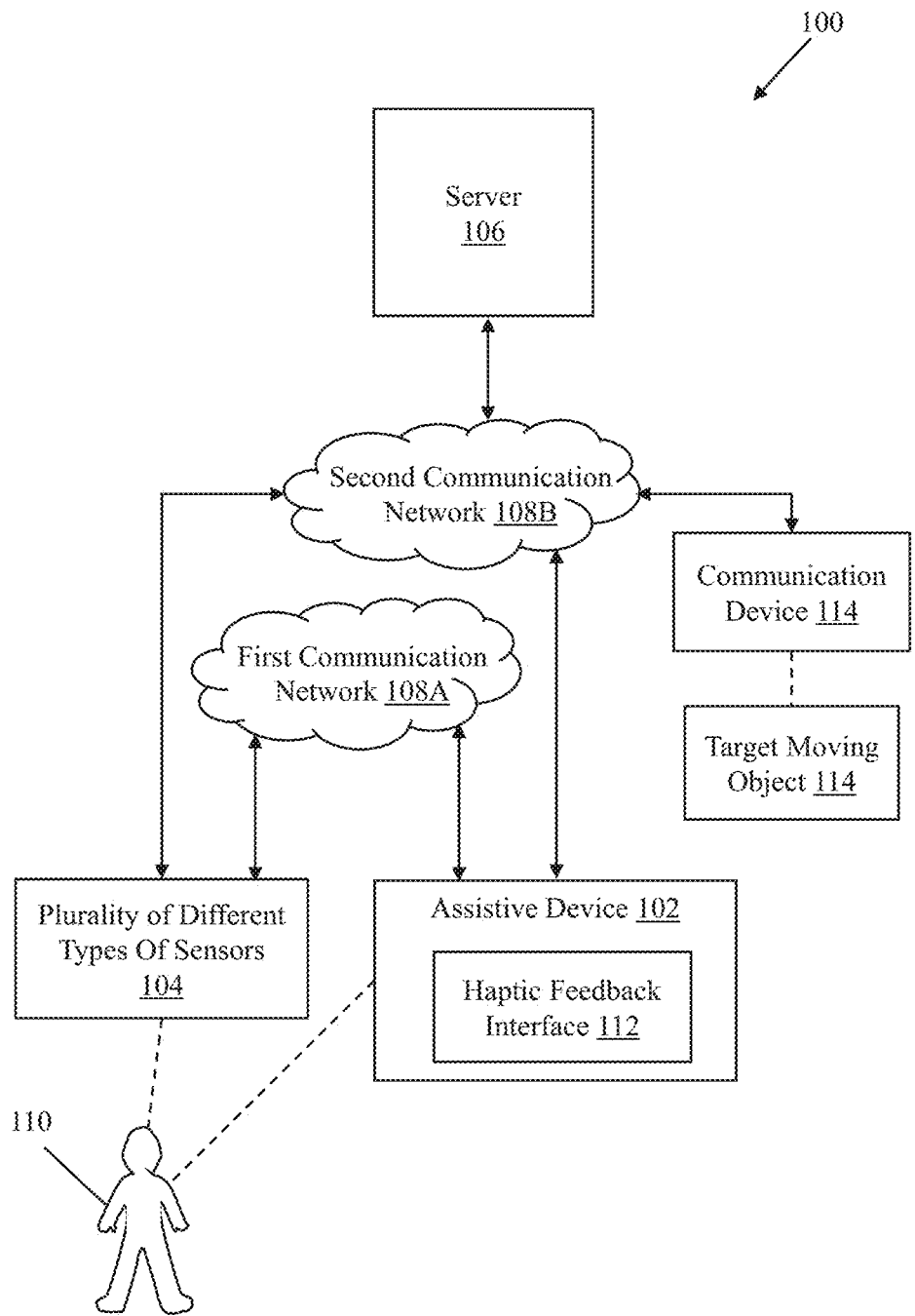
FIG. 1 illustrates an exemplary environment for providing non-visual assistance to a user by an assistive device for tracking a movable object, in accordance with an embodiment of the disclosure.

The following described implementations may be found in the disclosed assistive device and method for providing non-visual assistance to a user to perceive the surrounding world. Exemplary aspects of the disclosure may include an assistive device that may include a haptic feedback interface that includes a plurality of haptic elements. The assistive device may further include a haptic feedback controller configured to generate a first touch-discernible output layout on the haptic feedback interface using the plurality of haptic elements. The first touch-discernible output layout may correspond to a first reproduction of a three-dimensional (3D) real-world area within a first proximity range of the assistive device. The haptic feedback controller may be configured to generate a first set of different haptic indicators that are spatially arranged on the haptic feedback interface to discern a first set of moving objects of the 3D real-world area within the first proximity range. The first touch-discernible output layout includes the first set of different haptic indicators. The haptic feedback controller may be configured to receive a selection of a first haptic indicator of the first set of different haptic indicators based on a first user input via the haptic feedback interface. The first haptic indicator discerns a target moving object in the first set of moving objects. The haptic feedback controller may be further configured to execute a transition from the first touch-discernible output layout to a second touch-discernible output layout based on a movement of the target moving object from the first proximity range to a second proximity range of the assistive device. The second touch-discernible output layout may correspond to a second reproduction of the 3D real-world area within the second proximity range of the assistive device. The second touch-discernible output layout may include a second set of different haptic indicators that are spatially arranged on the haptic feedback interface to discern movement of a second set of moving objects, including the target moving object, of the 3D real-world area within the second proximity range.

In accordance with an embodiment, the selection of the first haptic indicator may correspond to a prompt to track the movement of the target moving object in the 3D real-world area. The haptic feedback controller may be further configured to track the movement of the target moving object in the 3D real-world area based on the received selection. The haptic feedback controller may be configured to output at least one of an audio feedback by one or more audio output devices provided in the assistive device or one or more haptic mobility signals in combination with the first touch-discernible output layout or the second touch-discernible output layout based on the tracked movement of the target moving object, to provide navigation assistance from a current position of a user of the assistive device towards the target moving object.

In accordance with an embodiment, the assistive device may also include a first circuitry that may be configured to transmit a mobility control signal to a communication device of the target moving object based on a second user input via the haptic feedback interface. A user of the assistive device may control the movement of the target moving object by the mobility control signal.

In accordance with an embodiment, the haptic feedback controller may be configured to differently control a rate-of-change of movement of each of the first set of different haptic indicators on the haptic feedback interface based on a distance of each of the first set of moving objects present in the 3D real-world from a user of the assistive device. The assistive device may also include a second circuitry that may be configured to determine a spatial scaling factor for each of the first set of moving objects present in the 3D real-world based on the distance of each of the first set of moving objects from the user of the assistive device. The rate-of-change of movement of each of the first set of different haptic indicators may be controlled in accordance with the spatial scaling factor determined for a corresponding moving object of the first set of moving objects.

In accordance with an embodiment, the haptic feedback controller may be further configured to differently control a rate-of-change of movement of each of the second set of haptic indicators on the haptic feedback interface based on a distance of each of the second set of moving objects present in the 3D real-world from a user of the assistive device. The assistive device may also include a second circuitry that may be configured to determine a spatial scaling factor for each of the second set of moving objects present in the 3D real-world based on the distance of each of the second set of moving objects from the user of the assistive device. The rate-of-change of movement of each of the second set of haptic indicators may be controlled in accordance with the spatial scaling factor determined for a corresponding moving object of the second set of moving objects.

In accordance with an embodiment, the haptic feedback controller may be further configured to differently control a size of each of the first set of different haptic indicators on the haptic feedback interface based on a distance of each of the first set of moving objects present in the 3D real-world from a user of the assistive device. The first haptic indicator has a first size in the first touch-discernible output layout and a second size in the second touch-discernible output layout such that the first size is different from the second size.

In accordance with an embodiment, the first proximity range may be greater than the second proximity range. In some embodiments, the first proximity range may be smaller than the second proximity range.

In accordance with an embodiment, the first touch-discernible output layout may further include a unique haptic indicator in combination with the first set of different haptic indicators. The unique haptic indicator may discern a relative position of a user of the assistive device with respect to each of the first set of moving objects present in the 3D real-world area within the first proximity range of the assistive device. The second touch-discernible output layout may further include the unique haptic indicator in combination with the second set of different haptic indicators. The unique haptic indicator may discern a relative position of the user of the assistive device with respect to each of the second set of moving objects present in the 3D real-world area within the second proximity range of the assistive device.

In accordance with an embodiment, each of the first set of different haptic indicators in the first touch-discernible output layout may be generated as a protrusion of a defined shape-pattern from the haptic feedback interface. In some embodiments, a series of protrusions may be generated along a path on the haptic feedback interface to discern movement of an object of the first set of moving objects within the first proximity range by tactioception based on a user touch on the first touch-discernible output layout on the haptic feedback interface.

In accordance with an embodiment, the first set of different haptic indicators and the second set of different haptic indicators may be generated by a touch-discernible modality that includes at least one of a differential pressure-based modality, a differential temperature-based modality, a differential electric pulse-based modality, a differential raised shape pattern-based modality, or a combination of different touch-discernible modalities.

The assistive device of the proposed disclosure provides non-visual assistance to people that have impaired or lost sight and enables them to understand the surrounding world similar to the sighted people, who are people that have no impairment or loss of sight. For example, a person with impaired or lost sight may be able to easily track and follow the movement of a specific object (such as a child, a pet, or the like) in real word using the disclosed assistive device.

FIG. 1 illustrates an exemplary environment for providing non-visual assistance to a user by an assistive device for tracking a movable object, in accordance with an embodiment of the disclosure. With reference to FIG. 1, there is shown an exemplary environment 100. The exemplary environment 100 may include an assistive device 102, a plurality of different types of sensors 104, a server 106, a first communication network 108A, a second communication network 108B, and one or more users, such as a user 110. The assistive device 102 may include a haptic feedback interface 112. The exemplary environment 100 may further include a target moving object 114, and a communication device 116. The assistive device 102 may be communicatively coupled to the plurality of different types of sensors 104 via the first communication network 108A or the second communication network 108B. The assistive device 102 may be communicatively coupled to the server 106 via the second communication network 108B. The assistive device 102 may be communicatively coupled to the communication device 116 via the second communication network 108B.

The assistive device 102 may include suitable logic, circuitry, interface, and/or code, executable by the circuitry, to generate a first touch-discernible output layout on the haptic feedback interface 112. The first touch-discernible output layout may correspond to a first reproduction of a three-dimensional (3D) real-world area within a first proximity range of the assistive device 102. The first touch-discernible output layout may include a first set of different haptic indicators to discern a first set of moving objects, including the target moving object 114, of the 3D real-world area within the first proximity range. The assistive device 102 may be used to track a movement the target moving object 114 discerned by a first haptic indicator of the first set of different haptic indicators. The first touch-discernible output layout may be transitioned to a second touch-discernible output layout based on a movement of the target moving object 114 from the first proximity range to a second proximity range of the assistive device 102. The 3D real-world area surrounding the user 110 may be an indoor area or an outdoor area. Examples of implementation of the assistive device 102 may include, but are not limited to a special-purpose portable assistive device, special-purpose hand gloves, special-purpose shoes, or a wearable device that may be worn as a wrist band, wrapped around arms, or any part of human body or as a shoe sole.

The plurality of different types of sensors 104 may include suitable logic, circuitry, and/or interfaces that may be configured to detect one or more cues of the 3D real-world area surrounding the user 110, and generate a corresponding output, such as sensor data. The plurality of different types of sensors 104 may include wearable sensors that may be worn by the user 110, sensors that may be integrated with the assistive device 102, or other personal devices, such as a smartphone, of the user 110. Examples of the plurality of different types of sensors 104 may include, but are not limited to, a motion sensor (such as an accelerometer and a gyroscope), a location sensor (such as a global positioning system (GPS) sensor), a direction detecting sensor (such as a compass or magnetometer), an image-capture device (such as a stereoscopic camera, 360 degree camera, a wide-angle camera, or other image sensors), an atmospheric pressure detection sensor (such as a barometer), a depth sensor, an altitude detection sensor (such as altimeter), a lux meter, a radio frequency (RF) sensor, an ultrasound sensor, or an object detection sensor (such as Radar, Light Detection and Ranging (LIDAR), and an infrared (IR) sensor).

The server 106 may comprise suitable logic, circuitry, interfaces, and/or code, executable by the circuitry, that may be configured to store satellite imagery, street maps, and 360 degree panoramic views of streets of various geographical areas. In some embodiments, the server 106 may be configured to communicate a first template map of the 3D real-world area for a location of the assistive device 102, based on a template map request for the location received from the assistive device 102. In accordance with an embodiment, the server 106 may be configured to store historical usage pattern data of a plurality of different users, such as the user 110. Examples of the server 106 may include, but are not limited to, a cloud server, an application server, a database server, a web server, a file server, and/or any combination thereof.

The first communication network 108A may be a medium that may enable communication between the assistive device 102 and the plurality of different types of sensors 104. The first communication network 108A may be implemented by one or more wired or wireless communication technologies known in the art. The first communication network 108A may refer to a short-range or medium-range wireless communication network. Examples of wireless communication networks may include, but are not be limited to, a Wireless-Fidelity (Wi-Fi) based network, a Light-Fidelity (Li-Fi) based network, a wireless personal area network (WPAN) such as a Bluetooth network, Internet-of-Things (IoT) network, Machine-Type-Communication (MTC) network, and/or a Wi-Max based network.

The second communication network 108B may be a medium that may facilitate communication between the assistive device 102 and the server 106, and the communication device 116 and the server 106. The second communication network 108B may be implemented by one or more wireless communication technologies known in the art. Examples of the wireless communication networks may include, but not limited to, the Internet, a cloud network, a wireless wide area network (WWAN), a Local Area Network (LAN), a plain old telephone service (POTS), a Metropolitan Area Network (MAN), or a cellular or mobile network, such as Global System for Mobile Communications (GSM), General Packet Radio Service (GPRS), Enhanced Data Rates for GSM Evolution (EDGE), 1G, 2G, 3G, 4G Long Term Evolution (LTE), 5G, IEEE 802.11, 802.16, and the like.

The haptic feedback interface 112 may comprise a plurality of haptic elements. In accordance with an embodiment, the haptic feedback interface 112 may refer to a haptic output interface configured to provide at least a touch-discernible output to the user 110. In some embodiments, the haptic feedback interface 112 may refer to a haptic input/output (I/O) interface configured to receive haptic input as well as provide haptic output to the user 110 from the same haptic I/O interface. It is known that the sense of touch has a much greater sensory resolution than the sense of sight. Hence, the sense of touch can detect even small changes on a surface that the eye may fail detect. This principle of the sense of touch may be used to guide the design of the haptic feedback interface 112.

In accordance with an embodiment, the user 110 may be a person who have lost or impaired the sense of sight. The user 110 may want to learn and understand the surrounding world, and track the movement of the target moving object 114 in the 3D real-world area. It is known that sighted people visualize the surrounding world by detection of edges between areas of different wavelengths of light, which is then perceived as different colors by brain. Based on feedback from the visual system, visual part of the brain referred to as visual cortex, processes visual information of the surrounding world to enable the sighted people to visualize the surrounding world. It is also known the loss of one or more senses, such as the sense of sight, generally results in enhancement of one or more of the remaining senses, such as sense of touch, hearing, smell, or taste, to compensate for the lost sense(s). The assistive device 102 harnesses the non-visual senses, such as the sense of touch, hearing, or smell, to assist users, such as the user 110, who have lost or impaired the sense of sight for enhanced and accurate understanding of the 3D real-world area surrounding the user 110. The assistive device 102 may also be used even by sighted people in certain situations where human vision is of limited use, for example, in areas that are devoid or partially devoid of light, for example, during night to augment sense of sight using other human senses, such as audioception, olfacoception, and tactioception.

The target moving object 114 may be a person, an animal, or inanimate object that is of interest to the user 110. For example, the target moving object 114 may be a child or a pet whose movement the user 110 wants to track. In another example, the target moving object 114 may be a vehicle (for example, a wheelchair, a cycle, or the like) whose movement the user 110 wants to track. The assistive device 102 may assist the user 110 in tracking the movement of the target moving object 114.

The communication device 116 may include suitable logic, circuitry, interface, and/or code, executable by the circuitry, to receive one or more mobility control signals from the assistive device 102 through the second communication network 108B. The movement of the target moving object 114 may be controlled based on the one or more mobility control signals. Examples of the communication device 116 may include, but are not limited to a smartphone, a mobile phone, a tablet, a phablet, a special-purpose portable device, or a wearable device that may be worn as a band, which wrapped around the wrist (a wristband), arms (an armband), or any part of human body. In some embodiments, the communication device 116 may be another assistive device that may be functionally similar to the assistive device 102.

In operation, the assistive device 102 may be configured to receive sensor data of the 3D real-world area within the first proximity range of the assistive device 102 from the plurality of different types of sensors 104 that are communicatively coupled to the assistive device 102. The plurality of different types of sensors 104, for example, may include the location sensor, the motion sensor, the RF sensor, the ultrasound sensor, the IR sensor, or other types of object detection sensor (such as Radar or LIDAR), and an image-capture device. The image-capture device may refer to a stereoscopic camera, 360 degree camera, a night vision camera, a wide-angle camera, or other image sensors or their combination. Thus, in certain scenarios, where one type of sensor may not capture accurate information of the 3D real-world area within the first proximity range of the assistive device 102, other types of sensors may compliment and capture of information of the 3D real-world area.

In accordance with an embodiment, the plurality of different types of sensors 104 may include sensors, for example, rain sensors, altimeter, lux meter, barometer, and the like, that senses environmental conditions and/or characteristics, such as weather conditions or lighting conditions). Based on the environmental conditions and/or characteristics, information of the 3D real-world area acquired from a first group of sensors of the plurality of different types of sensors 104 may be assigned a higher weight value (for example, preferable) than information acquired from a second group of sensors of the plurality of different types of sensors 104. The classification of sensors in the first group of sensors and the second group of sensors may be done based on defined criteria and the sensed environmental conditions and/or characteristics. The defined criteria, for example, may be defined rules based on known accuracy of information detected in different environment conditions from each sensor. For example, in certain weather condition (for example, foggy weather or rainy weather), the information, such as images captured from the image-capture device may not be useful. In such scenarios, the sensor data from the RF sensor, LIDAR, ultrasound sensor, or the like, may be provided higher weight value as compared to the sensor data from the image-capture device.

In accordance with an embodiment, the sensor data received from each of the plurality of different types of sensors 104 may be in different formats. The assistive device 102 may be configured to transform the received sensor data into a common format to enable a correlation of information received from one sensor to other sensor of each of the plurality of different types of sensors 104. The sensor data from different input sources (i.e., the plurality of different types of sensors 104) may be processed concurrently into a common format.

In accordance with an embodiment, the assistive device 102 may be configured to generate the first touch-discernible output layout on the haptic feedback interface 112 using the plurality of haptic elements. The first touch-discernible output layout may correspond to a first reproduction of the 3D real-world area within the first proximity range of the assistive device 102. The assistive device 102 may be further configured to generate a first set of different haptic indicators that are spatially arranged on the haptic feedback interface 112 to discern a first set of moving objects (for example, including the target moving object 114) of the 3D real-world area within the first proximity range. The first touch-discernible output layout may include the first set of different haptic indicators. The assistive device 102 may be configured to receive a selection of a first haptic indicator of the first set of different haptic indicators based on a first user input provided by the user 110 via the haptic feedback interface 112. The selected first haptic indicator may discern the target moving object 114 whose movement the user 110 wants to track. The selection of the first haptic indicator may correspond to a prompt to the assistive device 102 to track the movement of the target moving object 114. The assistive device 102 may be configured to track the movement of the target moving object 114 in the 3D real-world area based on the received selection. The assistive device 102 may be configured to execute a transition from the first touch-discernible output layout to a second touch-discernible output layout based on the movement of the target moving object 114 from the first proximity range to the second proximity range of the assistive device 102. The second touch-discernible output layout may correspond to a second reproduction of the 3D real-world area within the second proximity range of the assistive device 102. The second touch-discernible output layout may include a second set of different haptic indicators that are spatially arranged on the haptic feedback interface 112 to discern movement of a second set of moving objects, including the target moving object 114, of the 3D real-world area within the second proximity range. An example of the transition of the first touch-discernible output layout to the second touch-discernible output layout is shown and described, for example, in FIG. 4B. In accordance with an embodiment, the first proximity range may be greater than the second proximity range. In some embodiments, the first proximity range may be smaller than the second proximity range.

The assistive device 102 may be configured to control a rate-of-change of movement of each of the first set of different haptic indicators or each of the second set of different haptic indicators on the haptic feedback interface 112. The rate-of-change of movement may be controlled based a distance of each of the first set of moving objects or each of the second set of moving objects present in the 3D real-world area from the user 110 of the assistive device 102. For example, in cases where a sighted user looks very far (e.g., beyond "X" meters) in the 3D real-world area, the changes, such as movement of objects, may appear slow as compared to when the sighted user looks nearby (e.g., up to "Y" meters). In cases where the sighted user looks nearby (e.g., Y=30 meters), the changes, such as movement of objects, appears to be fast. In other words, the changes, such as movement of objects, may appear to be slow or fast depending upon a distance of the moving objects from the sighted user. Thus, in the haptic domain, the first set of different haptic indicators or the second set of haptic indicators that indicate moving objects may be controlled in accordance with the distance of each of the first set of moving objects or each of the second set of moving objects from the user 110 for realistic discerning of the 3D real-world area.

The assistive device 102 may be configured to control a size of each of the first set of different haptic indicators or each of the second set of different haptic indicators on the haptic feedback interface 112. The size may be controlled based the distance of each of the first set of moving objects or each of the second set of moving objects present in the 3D real-world area from the user 110 of the assistive device 102. For example, in cases where a sighted user looks very far (e.g., beyond "X" meters) in the 3D real-world area, a size of an object, may appear to be small as compared to when the sighted user looks at the same object nearby (e.g., up to "Y" meters). In cases where the sighted user looks nearby (e.g., Y=30 meters), the size of the same object, appears to be larger. In other words, the size of an object may appear to be small or large depending upon a distance of the object from the sighted user. Thus, in haptic domain, a size of each of the first set of different haptic indicators or each of the second set of haptic indicators that indicate moving objects may be controlled in accordance with the distance of each of the first set of moving objects or each of the second set of moving objects from the user 110 for realistic discerning of the 3D real-world area.

In some embodiments, the assistive device 102 may be implemented as one or more wearable devices that may be worn around at different parts of the human body. An exemplary implementation of the assistive device 102 as a wearable assistive device is shown, for example, in FIG. 3

Figure 2A:
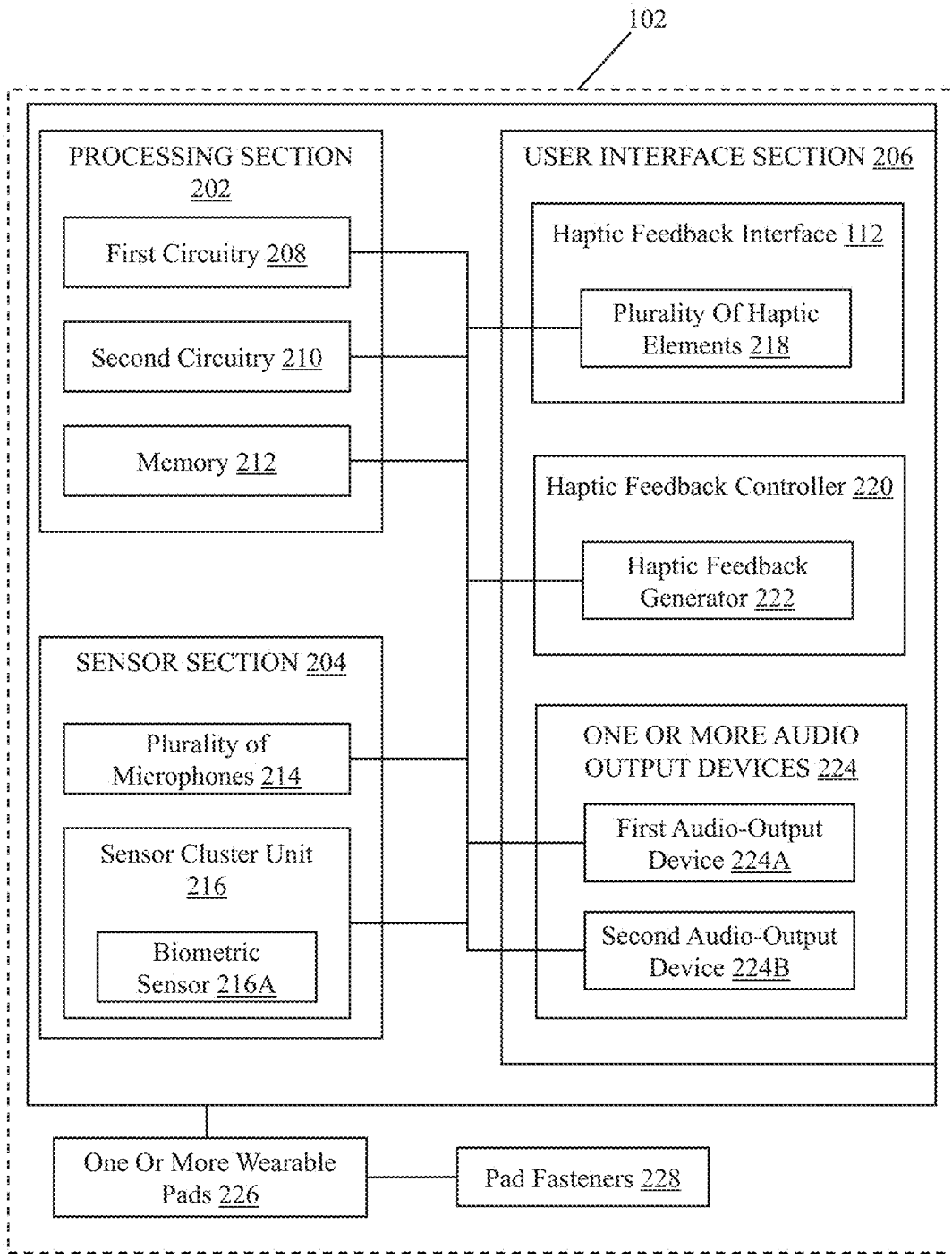
FIG. 2A is a block diagram that illustrates an exemplary assistive device for non-visually discerning a 3D real-world area surrounding a user for tracking a movable object, in accordance with an embodiment of the disclosure.

FIG. 2A is a block diagram that illustrates an exemplary assistive device for non-visually discerning a 3D real-world area surrounding a user for tracking a movable object, in accordance with an embodiment of the disclosure. FIG. 2A is explained in conjunction with elements from FIG. 1. With reference to FIG. 2A, there is shown the assistive device 102. The assistive device 102 may include a processing section 202, a sensor section 204, and a user interface section 206. The processing section 202 may include a first circuitry 208, a second circuitry 210, and a memory 212. The sensor section 204 may include a plurality of microphones 214 and a sensor cluster unit 216. The sensor cluster unit 216 may include at least a biometric sensor 216A. The user interface section 206 may include the haptic feedback interface 112, a haptic feedback controller 220, and one or more audio-output devices 224, such as a first audio-output device 224A and a second audio-output device 224B. The haptic feedback interface 112 may include a plurality of haptic elements 218. The haptic feedback controller 220 may include a haptic feedback generator 222.

In accordance with an embodiment, the assistive device 102 may be communicatively coupled to the plurality of different types of sensors 104 through the first communication network 108A and/or the second communication network 108B, by use of the first circuitry 208. The second circuitry 210 may be communicatively coupled to the memory 212, and the various components of the sensor section 204 and the user interface section 206, via a system bus.

The first circuitry 208 may comprise suitable logic, circuitry, interfaces, and/or code that may be configured to receive sensor data of the 3D real-world area within a defined proximity range (such as the first proximity range or the second proximity range) of the assistive device 102. The sensor data of the 3D real-world area may be received from the plurality of different types of sensors 104, via the first communication network 108A. In some embodiments, one or more sensors of the plurality of different types of sensors 104 may be provided as a part of the sensor cluster unit 216 as integrated sensors. In such a case, the sensor data may be acquired by the system bus for processing by the second circuitry 210. The first circuitry 208 may be further configured to communicate with external devices, such as the server 106 and the communication device 116, via the second communication network 108B. The first circuitry 208 may implement known technologies to support wireless communication. The first circuitry 208 may include, but are not limited to, a transceiver (e.g., a radio frequency (RF) transceiver), an antenna, one or more amplifiers, a tuner, one or more oscillators, a digital signal processor, a coder-decoder (CODEC) chipset, a subscriber identity module (SIM) card, and/or a local buffer.

The first circuitry 208 may communicate via wireless communication with networks, such as the Internet, an Intranet and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11a, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Li-Fi, Machine-Type-Communication (MTC) technology, a protocol for email, instant messaging, and/or Short Message Service (SMS).

The second circuitry 210 may refer to a digital signal processor (DSP). The second circuitry 210 may comprise suitable logic, circuitry, interfaces, and/or code that may be configured to generate a 3D digital model of the 3D real-world area within the first proximity range or the second proximity range based on the processing of the transformed sensor data in the common format. The generated 3D digital model may then be used to generate the first touch-discernible output layout or the second touch-discernible output layout on the haptic feedback interface 112 using the plurality of haptic elements 218. The assistive device 102 may be a programmable device, where the second circuitry 210 may execute instructions stored in the memory 212. Other implementation examples of the second circuitry 210 may include, but are not limited to a specialized DSP, a Reduced Instruction Set Computing (RISC) processor, an Application-Specific Integrated Circuit (ASIC) processor, a Complex Instruction Set Computing (CISC) processor, and/or other processors.

The memory 212 may comprise a learning engine. The second circuitry 210 may be configured to determine one or more patterns in a plurality of user interactions on the haptic feedback interface 112 over a period of time based on a track of a usage pattern of the assistive device 102 by the learning engine. The memory 212 may include suitable logic, circuitry, and/or interfaces that may be configured to store a set of instructions executable by the second circuitry 210. The memory 212 may be further configured to temporarily store one or more captured media streams, such as one or more videos or images of the 3D real-world area within the first proximity range or the second proximity range as image buffer for processing by the second circuitry 210. The memory 212 may also store usage history, an amount of pressure exerted by the user 110 while touching the haptic feedback interface 112 in the plurality of user interactions on the haptic feedback interface 112 over a period of time. The memory 212 may also store input and output preference settings by the user 110. Examples of implementation of the memory 212 may include, but not limited to, a random access memory (RAM), a dynamic random access memory (DRAM), a static random access memory (SRAM), a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The plurality of microphones 214 may comprise suitable circuitry and/or interfaces to receive an audio input. In accordance with an embodiment, the audio input may be provided by the user 110. The audio input may correspond to a voice input to the assistive device 102. In accordance with an embodiment, the plurality of microphones 214 may be muted or disabled in accordance with user preferences. The plurality of microphones 214 may include multiple microphones to capture sound emanating from the first proximity range or the second proximity range of the user 110 of the assistive device 102. Each microphone of the plurality of microphones 214 may be fitted at different locations of the assistive device 102.

The sensor cluster unit 216 may include a biometric sensor 216A, such as a fingerprint sensor, to decipher the identity of a user, such as the user 110. In certain scenarios, the assistive device 102 may be used by multiple users, for example, users of a same family, or group. In such a case, based on user authentication by use of the biometric sensor, a different usage profile and user settings may be loaded for different users. In some embodiments, the sensor cluster unit 216 may also include a temperature sensor and a pressure sensor to gauge pressure applied by a user, such as the user 110, on the haptic feedback interface 112. In some embodiments, one or more sensors of the plurality of different types of sensors 104 may be a part of the sensor cluster unit 216. For example, the sensor cluster unit 216 may include the location sensor, the image sensor, the RF sensor, the accelerometer, the gyroscope, the compass, the magnetometer, an integrated image-capture device, the depth sensor, the altimeter, a lux meter, an ultrasound sensor, the IR sensor, or one or more weather sensors.

The haptic feedback interface 112 may comprise the plurality of haptic elements 218. The plurality of haptic elements 218 may refer to an array of cylindrical tubes arranged at the surface of the haptic feedback interface 112. A person of ordinary skill in the art may understand that shape of each tube may be variable, such as conical, hexagonal, or other polygonal shapes, without departing from the scope of the disclosure. In accordance with an embodiment, the plurality of haptic elements 218 may be arranged as a layer (of array of cylindrical tubes) on the haptic feedback generator 222 such that a haptic signal may be generated by the haptic feedback generator 222 through each of the plurality of haptic elements 218. In accordance with an embodiment, one end (e.g. a proximal end) of each tube of the array of cylindrical tubes may be coupled to the haptic feedback generator 222, and the other end (e.g. a distal end) may be interspersed on the haptic feedback interface 112 such that a plurality of differential touch-discernible cues generated by the haptic feedback generator 222 in conjunction with the plurality of haptic elements 218 are discernible on the haptic feedback interface 112 by the sense of touch.

The haptic feedback controller 220 may comprise suitable circuitry and interfaces to control output of a touch-discernible feedback on the haptic feedback interface 112 by the haptic feedback generator 222. The haptic feedback controller 220 may be configured to sense a haptic user input via the plurality of haptic elements 218 based on a defined amount of pressure detected at one or more haptic elements of the plurality of haptic elements 218. The haptic feedback controller 220 includes the haptic feedback generator 222.

The haptic feedback generator 222 may facilitate generation of the touch-discernible haptic output layouts on the haptic feedback interface 112 under the control of the haptic feedback controller 220. The haptic feedback generator 222 may include one or more differential pressure generating units, differential electric pulse generating units, shape-pattern extension and retraction units, differential temperature generating units, and a level of protrusion setter to control elevation of raised shape patterns, such as spikes through the plurality of haptic elements 218. The haptic feedback generator 222 may be configured to generate a plurality of different haptic indicators by use of one or more of the differential pressure generating units, differential electric pulse generating units, shape-pattern extension and retraction units, differential temperature generating units, and the level of protrusion setter to control elevation of raised shape pattern.

The one or more audio-output devices 224, such as the first audio-output device 224A and the second audio-output device 224B, may comprise suitable circuitry and/or interfaces to generate an audio output for the user 110. In accordance with an embodiment, the audio output may be generated in-sync with the touch-discernible haptic output layout generated on the haptic feedback interface 112. In accordance with an embodiment, the audio output may be generated in-sync with a haptic input received on the haptic feedback interface 112 for multi-sense discern of the touch-discernible output layouts in different proximity range for enhanced understanding of the surrounding of the user 110. The haptic input may be detected by the haptic feedback controller 220 by use of the pressure sensor of the sensor cluster unit 216. In accordance with an embodiment, the one or more audio-output devices 224 may be muted or disabled based on a time-of-day or for a specific location, such as a public library where silence is solicited. Though FIG. 2A is shown to include two audio-input devices, a person of ordinary skill in the art may understand that the assistive device 102 may include a single audio-input device, or more than two audio-input devices. The other speakers may be placed at corners, for example, at extreme left and right corners of the assistive device 102, to aid in voice-based navigation of the user 110 as the user 110 moves with the assistive device 102 from one location to another location to follow the target moving object 114. In some embodiments, one or more audio-input devices may be provided or worn at different parts of the body of the user 110 for voice-based navigation of the user 110 as the user 110 moves with the assistive device 102 from one location to another location in the 3D real-world area. Such voice-based navigation may be provided in combination to the generated touch-discernible feedback, which may act synergistically to provide enhanced navigation assistance to the user 110 in a real time or near-real time as the user 110 moves in the 3D real-world area.

Figure 3:
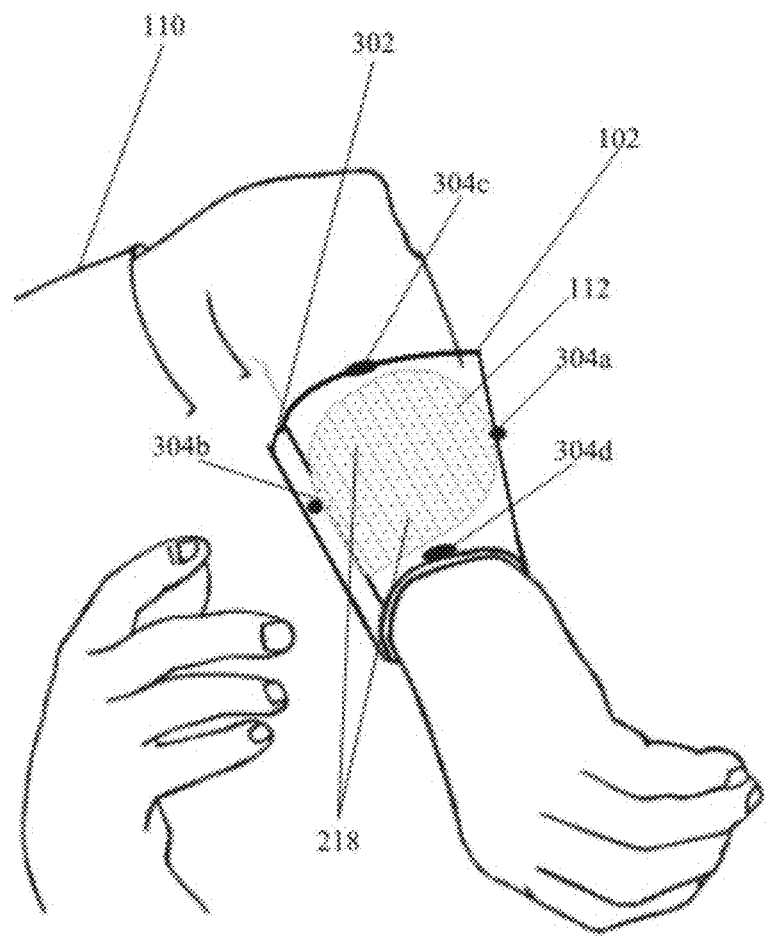
FIG. 3 illustrates an exemplary implementation of the exemplary assistive device of FIG. 2A as a wearable assistive device for providing non-visual assistance to a user, in accordance with an embodiment of the disclosure.

Each of the one or more wearable pads 226 may refer to a suitable pad that acts as a substrate for the assistive device 102. Each of the one or more wearable pads 226 may be water-resistant pads suitable to be worn on different parts of the human body, such as forearms (FIG. 3). In accordance with an embodiment, each of the one or more wearable pads 226 may be designed such that the haptic feedback interface 112 may be in contact to the skin of the human body. The pad fasteners 228 refer to detachable fasteners that allow the two terminal portions of each of the one or more wearable pads 226 to detachably affix with each other. Examples of the pad fasteners 228 may include, but are not limited to clips, hook and loop fastener, detachable straps, buttons, and the like.

In accordance with an embodiment, the assistive device 102 may include a plurality of other hardware control buttons (not shown), such as a power button to ON/OFF the assistive device 102, a reset button to reset the generated touch-discernible output layouts on the haptic feedback interface 112, one or more volume control buttons/wheels to control audio output from the first audio-output device 224A and the second audio-output device 224B, and a mute button to disable audio output.

In operation, the second circuitry 210 may be configured to detect a current location of the assistive device 102, by use of the location sensor. As the user 110 may be equipped with the assistive device 102, the location of the assistive device 102 may be same as that of the user 110. The location sensor may be an integrated sensor of the assistive device 102 provided in the sensor cluster unit 216 or may be one of the plurality of different types of sensors 104. The second circuitry 210 may be configured to determine whether a first template map of a 3D real-world area for the detected current location of the assistive device 102, is available. In some embodiments, where the first template map of the 3D real-world area is available, the first circuitry 208 may be configured to acquire the first template map of the 3D real-world area within the first proximity range (e.g., the first proximity range 402) of the assistive device 102. The first template map may be acquired from the server 106 based on the current location of the assistive device 102. In some embodiments, the memory 212 may store 2D/3D maps of geographical regions of the earth surface, such as street views. In such a case, the second circuitry 210 may be configured to retrieve the first template map of the 3D real-world area from the memory 212. The first template map may be available for certain outdoor areas, whereas such maps may not be available for indoor areas.

In accordance with an embodiment, the first circuitry 208 may be configured to receive sensor data of the 3D real-world area within the first proximity range of the assistive device 102 from the plurality of different types of sensors 104 that are communicatively coupled to the assistive device 102. In some embodiments, the sensor data may also be received from the sensor cluster unit 216. In some embodiments, the first template map of a 3D real-world area may not be acquired, for example, in case of indoor locations or for regions where the first template map may not be available. In such a case, the sensor data of the 3D real-world area received in real time or near-real time may be used to collect information of the 3D real-world area within the first proximity range of the assistive device 102.

In accordance with an embodiment, the second circuitry 210 may be further configured to identify an object-type of each of a first plurality of different objects present within the first proximity range of the assistive device 102 based on the received sensor data. The second circuitry 210 may be configured to determine a relative position of each of the first plurality of objects with respect to the position of the user 110 of the assistive device 102. The relative position of each of the first plurality of objects may be determined based on the sensor data received in real time or near-real time from the plurality of different types of sensors 104 worn by the user 110. The second circuitry 210 may be configured to determine a height of each of the first plurality of objects from the perspective of the height of the user 110 of the assistive device 102. The second circuitry 210 may be further configured to update the first template map in real time or near-real time based on the sensor data of the 3D real-world area.

The second circuitry 210 may be configured to determine the speed and the direction of travel of each of a first set of moving objects of the first plurality of objects within the first proximity range. In accordance with an embodiment, the second circuitry 210 may be configured to select a first touch-discernible modality from a plurality of touch-discernible modalities to generate a first plurality of different haptic indicators on the haptic feedback interface 112. The first plurality of different haptic indicators may be generated to discern the first plurality of objects within the first proximity range. The selection of the first touch-discernible modality may be based on learned user interaction information and a current weather condition in the 3D real-world area for the detected current location of the assistive device 102. The learned user interaction information may be determined based on a historical analysis of usage pattern data of the haptic feedback interface 112 by the learning engine provided in the memory 212. The plurality of touch-discernible modalities includes a differential pressure-based modality, a differential temperature-based modality, a differential electric pulse-based modality, a differential raised shape pattern-based modality. In some embodiments, a combination of different touch-discernible modalities may be selected based on the learned user interaction information, the current weather condition in the 3D real-world area, and a specified user-setting.

The differential pressure-based modality refers to generation of the first plurality of different haptic indicators as multi-level pressure or different amount of pressure on the haptic feedback interface. A user, such as the user 110, may feel different amount of pressure at different points (or portions) on the haptic feedback interface 112, which enables the user 110 to discern certain characteristics, for example, positioning or object-type of the first plurality of objects, of the 3D real world area by touch on the haptic feedback interface 112. Similarly, the differential temperature-based modality refers to generation of the first plurality of different haptic indicators as different temperatures, for example, different combination of hot and cold temperatures, on the haptic feedback interface 112. The different level of temperature may enable the user 110 to discern, certain characteristics, for example, positioning or object-type of the first plurality of objects, of the 3D real world area by touch on the haptic feedback interface 112. The differential electric pulse-based modality refers to generation of the first plurality of different haptic indicators as different level of electric-pulses on the haptic feedback interface 112. The different level of electric-pulses may enable the user 110 to feel, certain characteristics, for example, positioning or object-type of the first plurality of objects, of the 3D real world area by touch on the haptic feedback interface 112. The different level of electric-pulses may be felt as different amount of pain or pricking points. The differential raised shape pattern-based modality refers to generation of the first plurality of different haptic indicators as a plurality of protrusions of different shapes that may be extended from the surface of the haptic feedback interface 112. Each protrusion may be a raised shape-pattern or a bulge that may stick out from at least one or a group of haptic elements of the plurality of haptic elements of the haptic feedback interface 112. The plurality of protrusions may represent the first plurality of objects of the 3D real-world area within the first proximity range. An example of the generation of the first plurality of different haptic indicators as the plurality of protrusions of different shapes, is shown and described, for example, in FIG. 4B.

In accordance with an embodiment, the haptic feedback controller 220 may be configured to generate the first touch-discernible output layout on the haptic feedback interface 112 using the plurality of haptic elements 218 and the haptic feedback generator 222. The first touch-discernible output layout may be generated using the selected first touch-discernible modality from the plurality of touch-discernible modalities. The first touch-discernible output layout may correspond to a first reproduction of the 3D real-world area within the first proximity range of the assistive device 102. The first touch-discernible output layout may be generated using a modified 3D digital model of the 3D real-world area. The modified 3D digital model of the 3D real-world area by the second circuitry 210 based on the received sensor data. The modified 3D digital model may be generated by removal of one or more irrelevant objects in the 3D real-world area within the first proximity range. The relevancy and irrelevancy of each object in the first plurality of objects may be estimated with respect to the detected current position of the assistive device 102, and the relative positioning of each object of the first plurality of objects from a ground level at which the user 110 is located. For example, a fly-over in the 3D real-world area may not be relevant or useful while the user 110 may move below the fly-over at the ground level. Removal of irrelevant objects detected in the 3D real-world area within the first proximity range for the generation of the modified 3D digital model, may significantly save the processing time and battery power consumption for the generation of the first touch-discernible output layout.

The generated first plurality of different haptic indicators may include a first set of different haptic indicators generated to discern movement of the first set of moving objects within the first proximity range. In other words, the first touch-discernible output layout may include the first set of different haptic indicators to discern the movement of the first set of moving objects within the first proximity range. The first plurality of different haptic indicators, including the first set of different haptic indicators, may be spatially arranged on the haptic feedback interface 112 in a defined region such that a spatial arrangement of the first plurality of objects in the 3D real-world area within the first proximity range of the assistive device 102 is discernible by tactioception based on a user touch on the first touch-discernible output layout. The first touch-discernible output layout may also include a unique haptic indicator that corresponds to a position of the user 110 of the assistive device 102. The unique haptic indicator may be one of the first plurality of different haptic indicators generated on the haptic feedback interface 112. The unique haptic indicator may be indicative of a relative position of the user 110 with respect to each of the first plurality of objects present in the 3D real-world area within the first proximity range of the assistive device 102.

It may be advantageous to include the unique haptic indicator that is representative of the user 110 as it enables the user 110 to non-visually discern the 3D real-world area from the perspective of the user 110 in the first proximity range by a touch on the unique haptic indicator followed by touch on other haptic indicators of the first plurality of different haptic indicators generated on the haptic feedback interface 112.

As the sensor data is received from different input sources (e.g., the plurality of different types of sensors 104), the computation of the relative position of each of the first plurality of objects with respect to the position of the user 110 of the assistive device 102, may be faster and more accurate as compared to sensor data received exclusively from one type of sensor, such as the image-capture device or in different environmental or weather conditions, for example, rain, hailstorm, during night, and the like. Although, an approximate distance of different objects in an image frame may be estimated by image processing, the distance or position of objects calculated from RF sensor or the LIDAR, may be faster and more accurate as compared to the image-processing methods. This helps to quickly and accurately generate the first touch-discernible output layout based on the generated common format of sensor data received from the plurality of different types of sensors 104.

In accordance with an embodiment, the haptic feedback controller 220 may be configured to receive a selection of a first haptic indicator of the first set of different haptic indicators based on a first user input (e.g., a haptic input) via the haptic feedback interface 112. The first haptic indicator may discern the target moving object 114 of the first set of moving objects. The selection of the first haptic indicator may correspond to a prompt to track the movement of the target moving object 114 in the 3D real-world area.

The haptic feedback controller 220 may be configured to track the movement of the target moving object 114 in the 3D real-world area based on the received selection. While tracking the movement of the target moving object 114 using the sensor data generated by one or more of the plurality of different types of sensors 104, the haptic feedback controller 220 may detect that the target moving object 114 has moved from the first proximity range to the second proximity range. In such a scenario, the second circuitry 210 may be configured to calibrate one or more of the plurality of different types of sensors 104 to receive sensor data in accordance with the second proximity range. The second circuitry 210 may be configured to determine the speed and the direction of travel of each of a second set of moving objects, including the target moving object 114, of a second plurality of objects within the second proximity range. The second circuitry 210 may be further configured to monitor/track the relative position of each of the second plurality of objects with respect to the position of the user 110 of the assistive device 102. The relative position of each of the second plurality of objects may be monitored based on the sensor data of the second proximity range received in real time or near-real time from the plurality of different types of sensors 104.

The haptic feedback controller 220 may be configured to execute a transition from the first touch-discernible output layout to the second touch-discernible output layout based on the movement of the target moving object 114 from the first proximity range to the second proximity range. The second touch-discernible output layout may correspond to a second reproduction of the 3D real-world area covering the second proximity range. The second touch-discernible output layout may be a second 3D layout that comprises a second plurality of different haptic indicators. The second plurality of different haptic indicators may be spatially arranged on the haptic feedback interface 112 in the defined region such that a spatial arrangement of the second plurality of objects in the 3D real-world area within the second proximity range may be discernible by tactioception based on a user touch on the second touch-discernible output layout. The second plurality of different haptic indicators may include one or more haptic indicators of the first set of different haptic indicators such as the first haptic indicator and/or a second set of different haptic indicators to discern movement of a second set of moving objects. The second set of moving objects may include one of more objects from the first set of moving objects and/or new objects detected within the second proximity range.

The second touch-discernible output layout may also include the unique haptic indicator that corresponds to a current position of the user 110 of the assistive device 102 on the second touch-discernible output layout. The unique haptic indicator of the second plurality of different haptic indicators generated on the haptic feedback interface 112 may be indicative of a relative (or updated) position of the user 110 with respect to each of the second plurality of objects present in the 3D real-world area within the second proximity range of the assistive device 102.

In accordance with an embodiment, the second circuitry 210 may be configured to estimate a spatial scaling factor for each of the first set of moving objects present in the 3D real-world based on the distance of each of the first set of moving objects from the user 110 of the assistive device 102. The haptic feedback controller 220 may be configured to control a rate-of-change of movement of each of the first set of different haptic indicators on the haptic feedback interface 112. The rate-of-change of movement of each of the first set of different haptic indicators may be controlled in accordance with the spatial scaling factor determined for the corresponding moving object of the first set of moving objects. For example, the rate-of-change of movement of the first haptic indicator may be controlled in accordance with the spatial scaling factor determined for the target moving object 114. In other words, the haptic feedback controller 220 may be further configured to differently control the rate-of-change of movement of each of the first set of different haptic indicators on the haptic feedback interface 112 based on the distance of each of the first set of moving objects present in the 3D real-world from the user 110 of the assistive device 102.

The haptic feedback controller 220 may be further configured to differently control a size of each of the first set of different haptic indicators on the haptic feedback interface 112 in accordance with the spatial scaling factor determined for the corresponding moving object of the first set of moving objects. For example, the size of the first haptic indicator may be controlled in accordance with the spatial scaling factor determined for the target moving object 114. In other words, the haptic feedback controller 220 may be further configured to differently control the size of each of the first set of different haptic indicators on the haptic feedback interface 112 based on the distance of each of the first set of moving objects present in the 3D real-world from the user 110 of the assistive device 102.

Similarly, the second circuitry 210 may be configured to estimate a spatial scaling factor for each of the second set of moving objects present in the 3D real-world based on the distance of each of the second set of moving objects from the user 110 of the assistive device 102. The haptic feedback controller 220 may be configured to control a rate-of-change of movement of each of the second set of different haptic indicators on the haptic feedback interface 112. The rate-of-change of movement of each of the second set of different haptic indicators may be controlled in accordance with the spatial scaling factor determined for the corresponding moving object of the second set of moving objects. In other words, the haptic feedback controller 220 may be further configured to differently control the rate-of-change of movement of each of the second set of different haptic indicators on the haptic feedback interface 112 based on the distance of each of the second set of moving objects present in the 3D real-world from the user 110 of the assistive device 102.

The haptic feedback controller 220 may be further configured to differently control a size of each of the second set of different haptic indicators on the haptic feedback interface 112 in accordance with the spatial scaling factor determined for the corresponding moving object of the second set of moving objects. In other words, the haptic feedback controller 220 may be further configured to differently control the size of each of the second set of different haptic indicators on the haptic feedback interface 112 based on the distance of each of the second set of moving objects present in the 3D real-world from the user 110 of the assistive device 102. Therefore, the first haptic indicator may have a first size when included on the first touch-discernible output layout and a second size when included on the second touch-discernible output layout. The first size may be different from the second size.

In accordance with an embodiment, the assistive device 102 may be configured to receive a second user input provided by the user 110 via the haptic feedback interface 112. The second user input may be provided by the user 110 to control the movement of the target moving object 114. In an example, the second user input may be accompanied by an audio input provided by the user 110 using the plurality of microphones 214. The second user input may correspond to a command provided by the user 110 to control the movement of the target moving object 114. In an example, the second user input may be provided to stop the movement of the target moving object 114. In another example, the second user input may be provided to control a speed (e.g., increase or reduce) of movement of the target moving object 114. In another example, the second user input may be provided to control a direction of movement of the target moving object 114. Based on the second user input, the first circuitry 208 may be configured to generate and transmit a mobility control signal to the communication device 116 of the target moving object 114 through the second communication network 108B. Upon receiving the mobility control signal, the target moving object 114 may control corresponding movement in accordance with the mobility control signal. For example, when the second user input is an indication to stop the movement, the target moving object 114 may stop moving based on the mobility control signal received on the communication device 116.

In accordance with an embodiment, the haptic feedback generator 222 may be configured to continuously or periodically update the first touch-discernible output layout and/or the second touch-discernible output layout to reflect change in positioning of the moving objects.

In a first example, the selected first touch-discernible modality from the plurality of touch-discernible modalities to generate a plurality of different haptic indicators on the haptic feedback interface 112, may correspond to a differential pressure-based modality. The plurality of different haptic indicators refers to the first plurality of different haptic indicators in the first touch-discernible output layout or the second plurality of different haptic indicators in the second touch-discernible output layout. The plurality of different haptic indicators may be generated as multi-level pressure or different amount of pressure on the haptic feedback interface 112 by the haptic feedback generator 222. For example, a first object of a plurality of objects (e.g., the first plurality of objects or the second plurality of objects) in the 3D real-world area may be discernible by generating a haptic signal through one or more haptic elements of the plurality of haptic elements 218 as a first amount of pressure. This first amount of pressure may be felt by the user 110 when the user 110 touches a specific portion, for example, a first portion of the haptic feedback interface 112. Similarly, for each position of different objects of the plurality of objects, a different amount of pressure may be generated on the haptic feedback interface 112. Thus, the user 110 may feel different amount of pressure at different points (or portions) on the haptic feedback interface 112. The different amount of pressure enables the user 110 (by touch on the haptic feedback interface 112) to non-visually discern the relative positioning of the plurality of objects of the 3D real world area. The different amount of pressure in the generated first touch-discernible output layout or the second touch-discernible output layout corresponds to the plurality of different haptic indicators generated as multi-level pressure.

In a second example, the selected first touch-discernible modality from the plurality of touch-discernible modalities to generate a plurality of different haptic indicators on the haptic feedback interface 112, may correspond to a differential temperature-based modality. In accordance with an embodiment, the plurality of different haptic indicators may be generated as different temperatures, for example, different combination of hot and cold temperatures, on the haptic feedback interface 112 by the haptic feedback generator 222. For each position of different objects of the plurality of objects, a different temperature level may be generated on the haptic feedback interface 112 through one or more haptic elements of the plurality of haptic elements 218. The different level of temperature may enable the user 110 (by touch on the generated first touch-discernible output layout or the second touch-discernible output layout on the haptic feedback interface 112) to non-visually discern the relative positioning of the plurality of objects including the user 110 in the 3D real world area within the first proximity range or the second proximity range.

In a third example, the selected first touch-discernible modality from the plurality of touch-discernible modalities to generate a plurality of different haptic indicators on the haptic feedback interface 112, may correspond to a differential electric pulse-based modality. In this case, the plurality of different haptic indicators may be generated as different level of electric-pulses on the haptic feedback interface 112 by the haptic feedback generator 222. For each position of different objects of the plurality of objects, a different level of electric-pulse may be generated on the haptic feedback interface 112 through a haptic element of the plurality of haptic elements 218. The different level of electric-pulses may enable the user 110 (by touch on the generated first touch-discernible output layout or the second touch-discernible output layout on the haptic feedback interface 112) to non-visually discern the relative positioning of the plurality of objects of the 3D real world area. The different amount of electric-pulses in each of the generated first touch-discernible output layout or the second touch-discernible output may correspond to the plurality of different haptic indicators generated as different level of electric-pulses. Further, when an object of the plurality of objects moves in the 3D real-world area, an electric-pulse (i.e., a haptic indicator) may also be felt on the haptic feedback interface 122 to be moving as a continuous line from one point of the haptic feedback interface 122 to another point to represent the movement and a direction of movement of the object of the plurality of objects in the 3D real-world area. The generation of electric-pulse (i.e., a touch-discernible cue) along a certain path on the haptic feedback interface 122 may be synchronized to the actual movement of the object in the 3D real-world area. This allows the user 110 to understand the path of movement of the object via the haptic feedback interface 112. In accordance with an embodiment, the synchronization of the generation of electric-pulse (i.e., a touch-discernible cue) along a certain path on the haptic feedback interface 122 may be controlled based on the determined spatial scaling factor.

In a fourth example, the selected first touch-discernible modality from the plurality of touch-discernible modalities to generate a plurality of different haptic indicators on the haptic feedback interface 112, may correspond to a differential raised shape pattern-based modality. In this case, the plurality of different haptic indicators may be generated as a plurality of protrusions of different shapes and sizes that are extended from the surface of the haptic feedback interface 112. The plurality of protrusions of different shapes are shown, for example, in FIG. 4B, as the first plurality of different haptic indicators 416a to 416e. Each protrusion may be a raised shape-pattern or a bulge that sticks out from at least one or a group of haptic elements of the plurality of haptic elements 218 of the haptic feedback interface 112. The plurality of protrusions represents the plurality of objects of the 3D real-world area within the first proximity range or the second proximity range. One shape may be assigned to one identified object-type of the plurality of objects of the 3D real-world area within the first proximity range to enable the user 110 to discern the object-type when the user 110 touches a protrusion of a defined shape. For example, an oval shape protrusion may denote a particular object-type, for example, a car. Thus, when the user 110 touches the oval shape protrusion, the user 110 may readily identify the protrusion to be a car. Thus, similar to the sighted people who use information about the features on the surface of an object, like color, shading, or overall size, and shape, to recognize an object, the people who have lost the sense of sight may also have the capability to identify an object based on a touch on the protrusion of a defined shape, where an association of a particular shape with a particular object-type is learned by brain.

In accordance with an embodiment, the plurality of protrusions generated on the haptic feedback interface 112 enables the user 110 to discern not only the object-type but also a relative positioning of the plurality of objects and movement of one or more of the plurality of objects, from the perspective of the user 110. The haptic feedback generator 222 may be configured to control the extending and the retracting of the plurality of protrusions by use of the plurality of haptic elements 218.

In accordance with an embodiment, the haptic feedback generator 222 may be configured to control grouping of the plurality of haptic elements 218 during extension to represent a particular shape and/or a particular size for a protrusion. In accordance with an embodiment, the plurality of protrusions may be generated by application of different temperatures on different surface area of the haptic feedback interface 112. Notwithstanding, the plurality of protrusions may be generated by various methods, such as by electrochemical process, electro-mechanical process, without limiting the scope of the disclosure. In accordance with an embodiment, the plurality of different haptic indicators may be generated as different level of electric-pulses or a different amount of pressure, such as pain points (or pricking points) that may represent the positioning or movement of the plurality of objects of the 3D real world area in the generated first touch-discernible output layout or the second touch-discernible output layout.

In case of the assistive device 102 is a wearable device, as shown in FIG. 3, similar haptic indicators (e.g., different amount of pressure, different level of electric-pulses, different temperatures (such as hold and cold), different shape patterns, static or deformable protrusions, movement of haptic indicators), may be felt based on the contact of the skin of the user 110 with the haptic feedback interface 112 that may be wrapped on a body part, such as waist, or arm, as a wearable band. The movement of a haptic indicator, for example, a particular electric-pulse running from one point to another point of the haptic feedback interface 112, may further indicate a movement of an object of the plurality of objects in the 3D real-world area in the first proximity range or the second proximity range.

In certain scenarios, a user of the assistive device 102 may not be able to use all the five fingers of a hand while touching the haptic feedback interface 112. This may be due to one or more missing fingers, restricted movement because of injury in one or more fingers, an ailment, some bone fracture, or pain. In such cases, the haptic feedback controller 220 may be configured to automatically detect such impairments or restricted movement of the five fingers of the hand when the hand is placed on the haptic feedback interface 112. In some embodiment, the sensor data from the image-capture device (that may be worn by the user 110) of the plurality of different types of sensors 104, may be used to detect such impairments or restricted movement of the five fingers. The haptic feedback controller 220 may be configured to generate a touch-discernible haptic output layout (e.g., the first touch-discernible haptic output layout and/or the second touch-discernible haptic output layout) on the haptic feedback interface 112 in accordance with the detected impairment. For example, the area on which the entire touch-discernible haptic output layout may be reduced or modified to suit the detected impairment. The automatic detection of the impairments may be done when the assistive device 102 is set in auto-mode using a mode control button (not shown). In some embodiments, the user 110 may switch to a manual mode, where the user 110 may provide input via the haptic feedback interface 112 to indicate a specific impairment and configure the generation of the touch-discernible haptic output layout based on the provided input that indicates a particular impairment. In some embodiments, the functions of the control buttons, the haptic feedback interface 112, and the assistive device 102 may be configurable by the user 110 based on user inputs in a configuration mode. The configuration mode may be switched "ON" using a configure button (not shown) provided in the assistive device 102.

Figure 2B:
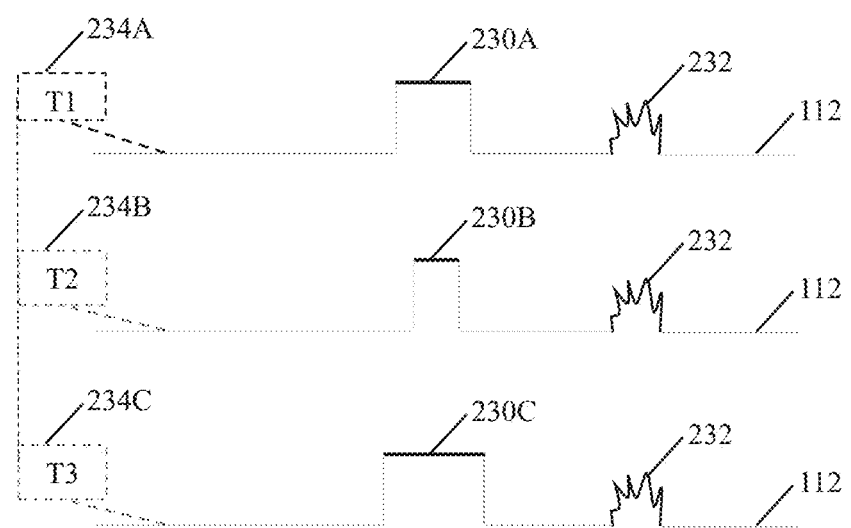
FIG. 2B illustrates exemplary protrusions on a haptic feedback interface of the assistive device of FIG. 2A for providing non-visual assistance to a user, in accordance with an embodiment of the disclosure.

FIG. 2B illustrates exemplary protrusions on a haptic feedback interface of the assistive device of FIG. 2A for providing non-visual assistance to a user, in accordance with an embodiment of the disclosure. With reference to FIG. 2B, there is shown a surface portion of the haptic feedback interface 112 with protrusions 230A to 230C and 232 at different time instants 234A to 234C.

At time instant 234A, the protrusion 230A may be generated on the surface portion of the haptic feedback interface 112 by the haptic feedback generator 222. The protrusion 230A may discern the target moving object 114. At time instant 234B, the protrusion 230A may change or deform to the protrusion 230B having a different size (for example, a reduced size or an increased size) as compared to the protrusion 230A. The shape of the protrusion 230A and the protrusion 230B may be same. At next time instant, such as the time instant 234C, the protrusion 230B may further change to the protrusion 230C with a different size, or return to its original size, such as the protrusion 230A. Different sizes of the protrusions 230A, 230B, and 230C indicate varying distance between the target moving object 114 and the user 110 at the time instances 234A, 234B, and 234C. Based on a touch on the constantly deforming protrusion (such as the protrusion 230A), the user 110 may discern the relative position of the target moving object 114 from the user 110 in the generated haptic touch-discernible output.

In accordance with an embodiment, the plurality of different haptic indicators may be generated as a plurality of protrusions of different shapes that are extended from the surface of the haptic feedback interface 112. For example, a round shape is indicative of human being, an oval shape may be indicative of vehicles, the square shape is indicative of buildings, the triangle shape is indicative of animal, the raised tapering lines may be indicative of a street. Different shapes generated by the haptic feedback generator 222, may not be limited to the oval, round, square, triangle, and other shapes, for example, any polygonal shapes may be generated based on user-preference. In accordance with an embodiment, the shape of a protrusion may be customized by users of the assistive device 102 in accordance with their needs or preferences. For example, a voice command may be provided by the user 110, for example, "generate a star-shaped pattern to represent a building". At least one of plurality of microphones 214 may capture the voice command. The second circuitry 210 may be configured to interpret the voice command and instruct the haptic feedback controller 220 to generate a star-shaped protrusion 232 based on the interpreted voice command. The haptic feedback controller 220 may be configured to generate the protrusion 232, which may be in a customized shape, such as the star-shaped pattern. In some embodiments, the customization of shape patterns may be done via the haptic feedback interface 112 using one or more control buttons (not shown).

FIG. 3 illustrates an exemplary implementation of the exemplary assistive device of FIG. 2A as a wearable assistive device for providing non-visual assistance to a user, in accordance with an embodiment of the disclosure. With reference to FIG. 3, there is shown the assistive device 102 worn by the user 110 as a wearable assistive device, which is described in conjunction with elements from FIGS. 1 and 2A. The assistive device 102 includes a wearable pad 302, a plurality of haptic mobility signal generators (HMSG), such as a first HMSG 304a, a second HMSG 304b, a third HMSG 304c, and a fourth HMSG 304d. There is also shown the haptic feedback interface 112 comprising the plurality of haptic elements 218. The wearable pad 302 may correspond to the one or more wearable pads 226.

The plurality of HMSGs refers to customized sensors that are configured to generate haptic signals, such as a vibration, a small-localized pain, or a poke, that be sensed by human body. The first HMSG 304a may be configured to generate a first haptic mobility signal to indicate the user 110 to move ahead. The second HMSG 304b may be configured to generate a second haptic mobility signal to indicate the user 110 to stop or perform an about-turn. The third HMSG 304c may be configured to generate a third haptic mobility signal to indicate the user 110 to turn left. Lastly, the fourth HMSG 304d may be configured to generate a fourth haptic mobility signal to indicate the user 110 to turn right. In accordance with an embodiment, the haptic feedback controller 220 may be configured to control output of one or more haptic mobility signals via the plurality of HMSGs to provide navigational assistance, for example, turn left, turn right, stop here, start moving ahead, and the like, in combination with the generated touch-discernible output layouts in both the indoor and the outdoor areas. In some embodiments, one haptic mobility signal may indicate to move one step in that direction. In some embodiments, one haptic mobility signal may indicate to continue moving in a particular direction until a next haptic mobility signal is generated. The output of different haptic mobility signals via the plurality of HMSGs may be controlled to provide navigational assistance in combination with the generated touch-discernible output layouts (e.g., the first touch-discernible output layout and/or the second touch-discernible output layout).

In accordance with an embodiment, the haptic feedback controller 220 may be configured to output an audio feedback by the one or more audio output devices 224 provided in the assistive device 102 and/or the one or more haptic mobility signals by the plurality of HMSGs in combination with the first touch-discernible output layout or the second touch-discernible output layout. The haptic feedback controller 220 may output the audio feedback and/or the one or more haptic mobility signals in combination with the first touch-discernible output layout or the second touch-discernible output layout to provide navigational assistance to the user 110 from a current position of the user 110 towards the target moving object 114. Such navigational assistance from the assistive device 102 may enable the user 110 to follow the target moving object 114. In other words, the audio feedback and/or the one or more haptic mobility signals in combination with the first touch-discernible output layout or the second touch-discernible output layout may cause the user 110 to follow a path that leads the user 110 towards the target moving object 114.

Figure 4A:
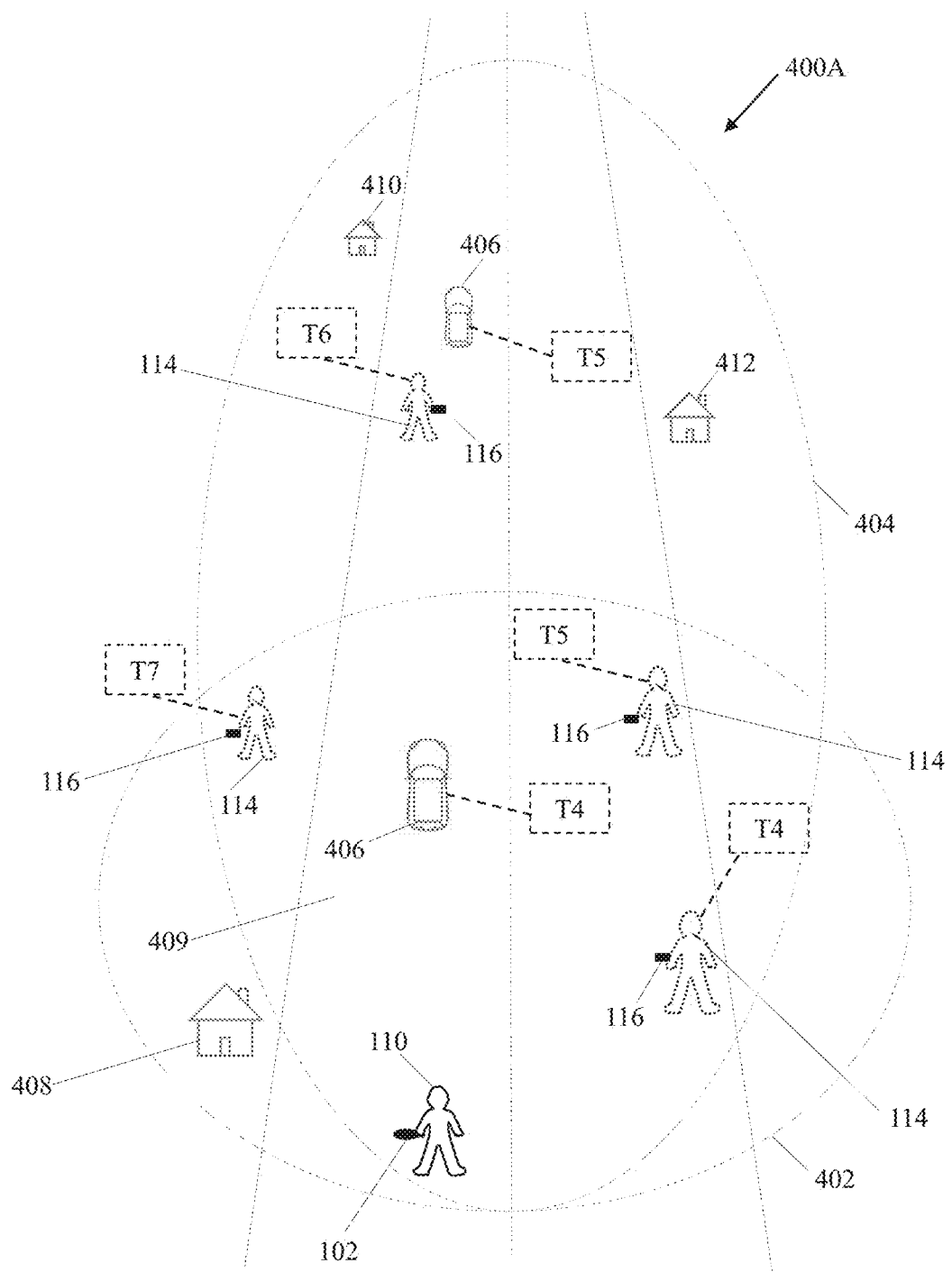
FIGS. 4A and 4B, collectively, are diagrams that illustrate an exemplary scenario for implementation of the assistive device and method for providing non-visual assistance to a user for tracking a movable object, in accordance with an embodiment of the disclosure.
Figure 4B:
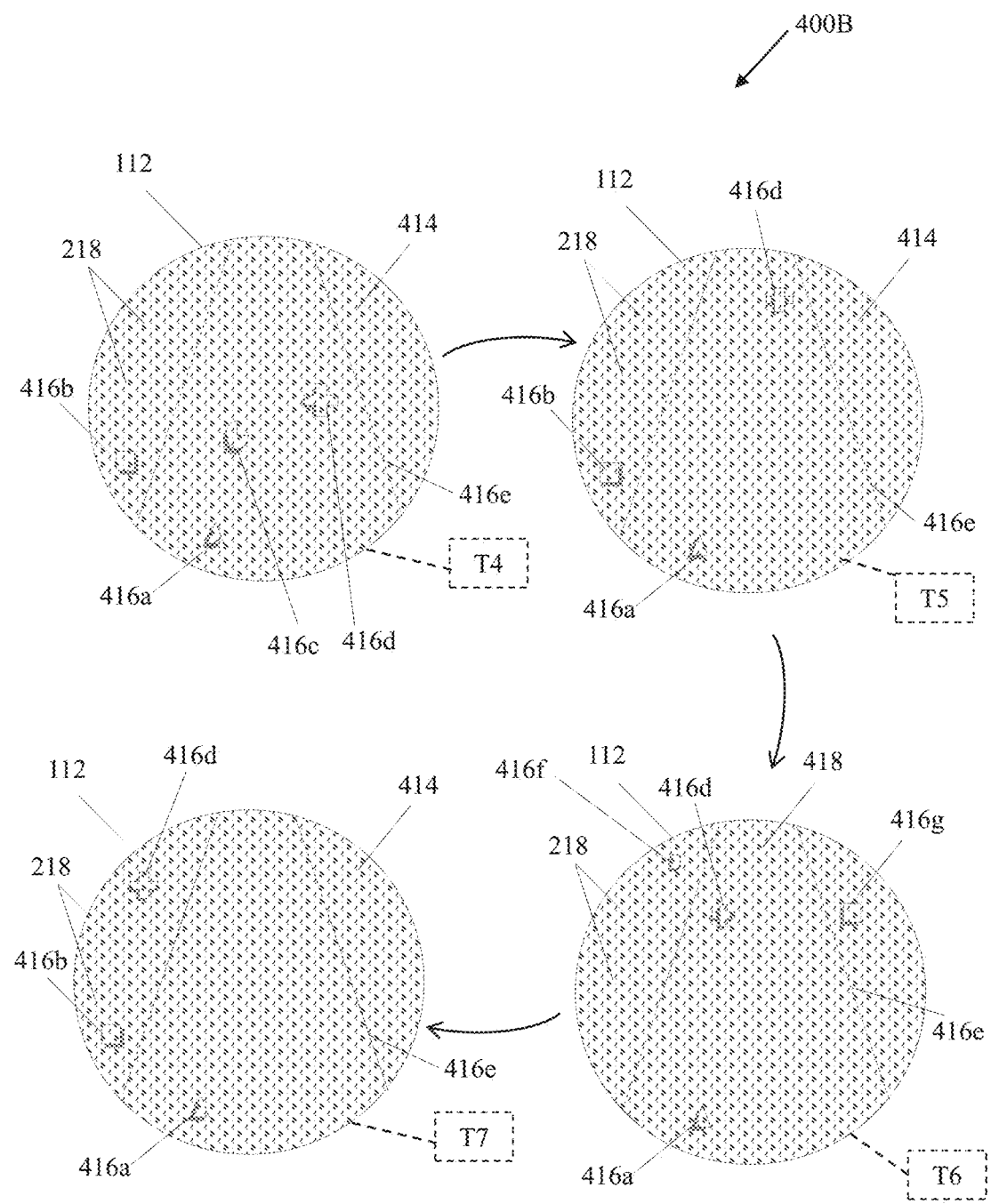

FIGS. 4A and 4B illustrate exemplary scenario diagrams for implementation of the assistive device and method for providing non-visual assistance to a user for tracking a movable object, in accordance with an embodiment of the disclosure. With reference to FIG. 4A, there is a shown a first exemplary scenario 400A, which is described in conjunction with elements from FIGS. 1, 2A, and 3. The first exemplary scenario 400A shows the user 110 with a wearable assistive device, such as the assistive device 102, present in a 3D real-world area. There is also shown a first proximity range 402 and a second proximity range 404 of the assistive device 102.

In accordance with the first exemplary scenario 400A, the user 110 may be a person with loss or impaired sight. The 3D-real world area surrounding the user 110 within the first proximity range 402 includes a first plurality of objects. The first plurality of objects may include both moving objects (e.g., the user 110, the target moving object 114, and a car 406), and stationary objects (e.g., a first building 408 and a street 409), as shown. The 3D-real world area surrounding the user 110 within the first proximity range 402 may include many other objects, such as trees, streetlights, and the like, which are not shown for the sake of brevity. Similarly, the 3D-real world area surrounding the user 110 within the second proximity range 404 includes a second plurality of objects. The second plurality of objects may include both moving objects and stationary objects (e.g., a second building 410, a third building 412, and the street 409), as shown. The 3D-real world area surrounding the user 110 within the first proximity range 402 may include many other objects, such as trees, streetlights, and the like, which are not shown for the sake of brevity.

Since the target moving object 114 and the car 406 are not stationary, their position continues to change with time. For example, as shown, at a time instance T4, the target moving object 114 having the communication device 116 and the car 406 are within the first proximity range 402. At another time instance T5 after the time instance T4, the car 406 has moved to the second proximity range 404 and the target moving object 114 is still within the first proximity range 402. At another time instance T6 after the time instance T5, the car 406 seems to have moved out of the second proximity range 404 and the target moving object 114 has moved from the first proximity range 402 to the second proximity range 404. At another time instance T7 after the time instance T6, the target moving object 114 has moved back to the first proximity range 402 from the second proximity range 404.

In accordance with the first exemplary scenario 400A, the user 110 may be wearing the assistive device 102 (for example, as shown in FIG. 3). The user 110 may press a power "ON" button or a start button to initiate receipt of sensor data from the plurality of different types of sensors 104. For example, an image-capture device may be worn as a headset or placed at a suitable position on the body of the user 110 to capture a 360 view of the 3D real-world area that surrounds the user 110 within the first proximity range 402, for example, "X" meters, where "X" refers to a distance in natural numbers. In this case, the first proximity range 402 may be 100 meters. A proximity range setter (not shown) may be provided in the assistive device 102, which may be used to set the desired first proximity range 402 by the user 110. In some embodiments, the first proximity range 402 may be a user-specified default range. In some embodiments, the first proximity range 402 may correspond to equal "X" meters range from the center that corresponds to the position of the user 110. In some embodiments, the first proximity range 402 may correspond to unequal "X" meters range from the position of the user 110, for example, more area may be covered in front, left, or right of the user 110 based on a direction of movement of the user 110 as compared to the rear area of the user 110.

In accordance with an embodiment, the first circuitry 208 may be configured to receive sensor data of the 3D real-world area within the first proximity range 402 of the assistive device 102. The sensor data may include the captured 360-degree view of the 3D real-world area that surrounds the user 110 within the first proximity range 402 and RF sensor data that provide an estimation of distances and motion of each the first plurality of objects from the position of the user 110. The sensor data may also include sensed data from the IR sensor of the plurality of different types of sensors 104. The sensed data from the IR sensor may be used to distinguish between living and non-living objects. The sensor data of the 3D real-world area within the first proximity range 402 may be received from the plurality of different types of sensors 104. The plurality of different types of sensors 104 may include wearable sensors that may be worn by the user 110, sensors that may be integrated with the assistive device 102, such as sensors of the sensor cluster unit 216, or sensors provided in other personal devices of the user 110. The sensor data of the 3D real-world area received in real time or near-real time may be used to collect information of the 3D real-world area within the first proximity range 402 of the user 110. The second circuitry 210 may be configured to generate the modified 3D digital model of the 3D real-world area, based on the received sensor data that is transformed in the common format.

With reference to FIG. 4B, there is shown a second exemplary scenario 400B that depicts a first touch-discernible output layout 414 generated on the haptic feedback interface 112 at the time instances T4, T5, and T7. The first touch-discernible output layout 414 generated at the time instance T4 includes a first plurality of different haptic indicators 416a to 416e that represents the first plurality of objects in the 3D real-world area that are present within the first proximity range 402 of the assistive device 102 at the time instance T4. The first touch-discernible output layout 414 generated at the time instance T5 includes the first plurality of different haptic indicators 416a, 416b, 416d, and 416e that represents the first plurality of objects in the 3D real-world area that are present within the first proximity range 402 of the assistive device 102 at the time instance T5. The first touch-discernible output layout 414 generated at the time instance T7 includes the first plurality of different haptic indicators 416a, 416b, 416d, and 416e that represents the first plurality of objects in the 3D real-world area that are present within the first proximity range 402 of the assistive device 102 at the time instance T7.

The second exemplary scenario 400B further depicts a second touch-discernible output layout 418 generated on the haptic feedback interface 112 at the time instance T6. The second touch-discernible output layout 418 generated at the time instance T6 includes a second plurality of different haptic indicators 416a, 416d, 416e, 416f, and 416g that represents the second plurality of objects in the 3D real-world area that are present within the second proximity range 404 of the assistive device 102 at the time instance T6.

In operation, the haptic feedback controller 220 may be configured to generate the first touch-discernible output layout 414 on the haptic feedback interface 112 using the plurality of haptic elements 218 and the haptic feedback generator 222. The first touch-discernible output layout 414 may be generated using the selected first touch-discernible modality, for example, raised shape-pattern based modality, from the plurality of touch-discernible modalities. The first touch-discernible output layout 414 may correspond to a first reproduction of the 3D real-world area within the first proximity range 402 of the assistive device 102. The first touch-discernible output layout 414 may include a first set of different haptic indicators (such as the haptic indicators 416a, 416c, and 416d) to discern movement of the first set of moving objects (such as the user 110, the car 406, and the target moving object 114, respectively) present within the first proximity range 402. The first touch-discernible output layout 414 may further include additional haptic indicators (such as the haptic indicators 416b and 416e) to discern stationary objects (such as the first building 408 and the street 409, respectively) present within the first proximity range 402.

Similar to the sighted people (i.e., people who have not lost sense of sight) who use information about the features on the surface of an object, like colour, shading, or overall size, and shape, to recognize an object, the people who have lost the sense of sight may also identify an object-type and object position based on a touch on the protrusion of a defined shape on the generated first touch-discernible output layout 414, where an association of a particular shape with a particular object-type is learned by the brain. For example, in this case a square shape is indicative of buildings, a cross-shape is indicative of other human beings, a partial circle is indicative of vehicles, and the raised tapering lines may be indicative of a street. Notwithstanding, different shapes generated by the haptic feedback generator 222, may not be limited to the partial circles, square, or cross, and that other shapes, for example, any polygonal shapes (e.g., the protrusion 232A (FIG. 2B)) may be generated. In accordance with an embodiment, the shape of a protrusion may be customized by users of the assistive device 102 in accordance with their needs or preferences, as described for example, in FIG. 2B.

The first touch-discernible output layout 414 may also include a unique haptic indicator, such as the haptic indicator 416a, which corresponds to a current position of the user 110 of the assistive device 102 in the 3D real-world area. It may be advantageous to include the unique haptic indicator that is representative of the user 110 as it enables the user 110 to non-visually discern the 3D real-world area from the perspective of the user 110 in the first proximity range 402 by a touch on the unique haptic indicator (such as the haptic indicator 416a) followed by touch on other haptic indicators 416b to 416e generated on the haptic feedback interface 112. In one example, based on the unique haptic indicator, such as the haptic indicator 416a, the user 110 may non-visually track, non-visually discern the movement, and non-visually navigate (if needed) to another user (such as target moving object 114) effectively, such as his son, daughter, or a loved one, playing in an outdoor area (e.g., a park) or in an indoor area (e.g., a building) using the assistive device 102.

The movement of the first set of different haptic indicators, such as the haptic indicators 416a, 416c, and 416d, may be updated continually or periodically in the first touch-discernible output layout 414 based on the tracked movement of the first set of moving objects, such as the user 110, the car 406, and the target moving object 114 present within the first proximity range 402. Thereafter, the haptic feedback controller 220 may be configured to receive a first user input at the assistive device 102 to select one of the first set of different haptic indicators 416a, 416c, and 416d as an object of interest for movement tracking. For example, the haptic feedback controller 220 may receive the first user input as the selection of the haptic indicator 416d discerning the movement of the target moving object 114.

In accordance with an embodiment, the user 110 may press the protrusion generated on the haptic feedback interface 112 as the haptic indicator 416d. Based on the amount of pressure exerted by the user 110 while touching the haptic indicator 416d on the haptic feedback interface 112, the press may be considered a haptic input by the haptic feedback controller 220. In cases where the amount of pressure exerted by the user 110 on a particular point or a protrusion on the haptic feedback interface 112 is greater than a threshold pressure value, the press of the protrusion (or a bulge) may be considered a haptic input for that particular object of the 3D real-world area that is indicated by the pressed protrusion. A corresponding action (for example, tracking the movement) related to the pressed protrusion may be executed by the haptic feedback controller 220 in association with the second circuitry 210. In accordance with an embodiment, different actions may be related to different amounts of pressures applied by the user 110 on the protrusion. For example, a first amount of pressure may indicate a movement tracking input to track a movement of another user (such as the target moving object 114) effectively, such as his son, daughter, or a loved one, playing in an outdoor area (e.g., a park) or in an indoor area (e.g., a building), while a second amount of pressure may indicate a user input for requiring additional information about the other user, such as a current location, an actual distance between the user 110 and the other user, or the like.

Although the first exemplary scenario 400A shows the target moving object 114 as another user, the scope of the disclosure is not limited to it. In another example, the target moving object 114 may be his pet (for example, a cat, a dog, or the like) playing in an outdoor area (e.g., a garden) or in an outdoor area (e.g., a building). In yet another example, the target moving object 114 may be an inanimate moving object (such as a moving toy).

At time instance T6, the target moving object 114 may move from the first proximity range 402 to the second proximity range 404. At this point, the haptic feedback controller 220 may be configured to execute a transition from the first touch-discernible output layout 414 to the second touch-discernible output layout 418. Although at the time instance T5 the car 406 had moved from the first proximity range 402 to the second proximity range 404, the haptic feedback controller 220 may not execute the transition from the first touch-discernible output layout 414 to the second touch-discernible output layout 418 as the target moving object 114 is within the first proximity range 402 and the car 406 is not an object of interest to the user 110.

To execute the transition to the second touch-discernible output layout 418, the second circuitry 210 may be configured to calibrate the one or more of the plurality of different types of sensors 104 to receive sensor data in accordance with the second proximity range 404. The second circuitry 210 may be configured to determine the speed and the direction of travel of each of a second set of moving objects, such as the user 110 and the target moving object 114 of a second plurality of objects (that also includes the street 409, the second building 410, and the third building 412, and excludes the first building 408) within the second proximity range 404. The second circuitry 210 may be configured to monitor/track the relative position of each of the second plurality of objects with respect to the position of the user 110 of the assistive device 102. The relative position of each of the second plurality of objects may be monitored based on the sensor data of the second proximity range 404 received in real time or near-real time from the plurality of different types of sensors 104. A sighted person may easily visualize their surroundings to understand how far or near other objects are from the sighted person. However, for a person who has lost or impaired sight, it is very difficult to judge how far or near other objects are from themself. Thus, by tracking the relative position of each of the second plurality of objects with respect to the position of the user 110, the assistive device 102 helps the user 110 to understand how far or near other objects are from themself.

The second touch-discernible output layout 418 may correspond to a second reproduction of the 3D real-world area generated based on the movement of the target moving object from the first proximity range 402 to the second proximity range 404. The second plurality of different haptic indicators 416a, 416d, 416e, 416f, and 416g may be spatially arranged on the haptic feedback interface 112 such that a spatial arrangement of the second plurality of objects in the 3D real-world area (such as the user 110, the target moving object 114, the street 409, the second building 410, and the third building 412 respectively) within the second proximity range 404 may be discernible by tactioception based on a user touch on the second touch-discernible output layout 418. The second plurality of different haptic indicators may include a second set of different haptic indicators 416a and 416d to discern movement of the second set of moving objects (such as the user 110 and the target moving object 114). The second set of moving objects may include one of more objects from the first set of moving objects in the first proximity range 402.

The second circuitry 210 may be further configured to estimate a spatial scaling factor for each of moving object within the first proximity range 402 and/or the second proximity range 404 based on the distance of each moving object from the user 110 in the 3D real-world. The haptic feedback controller 220 may be configured to control a rate-of-change of movement and a size of each of the first set of different haptic indicators (such as the haptic indicators 416a, 416c, and 416d) or each of the second set of different haptic indicators (e.g., the haptic indicators 416 and 416d) on the haptic feedback interface 112. The rate-of-change of movement and the size may be controlled based on the corresponding spatial scaling factor. The determined spatial scaling factor indicates a change of distance between the user 110 and a moving object to transform and reflect the change in haptic domain. For example, the size of the haptic indicator 416d continuously changes in the first touch-discernible output layout 414 and the second touch-discernible output layout 418 as the distance between the user 110 and the target moving object 114 continues to change. For example, the size of the haptic indicator 416d in the first touch-discernible output layout 414 generated at the time instance T5 is smaller than a size of the haptic indicator 416d in the first touch-discernible output layout 414 generated at the time instance T4, as the target moving object 114 has moved farther away from the user 110 at the time instance T5. Similarly, the size of the haptic indicator 416d in the second touch-discernible output layout 418 generated at the time instance T6 is smaller than a size of the haptic indicator 416d in the first touch-discernible output layout 414 generated at the time instance T7, as the target moving object 114 has moved nearer to the user 110 at the time instance T7.

In accordance with an embodiment, the haptic feedback generator 222 may be configured to update the second touch-discernible output layout 418 continuously or periodically to reflect change in positioning of the moving objects within the second proximity range 404.

At time instance T7, the target moving object 114 may move back to the first proximity range 402 from the second proximity range 404. At this point, the haptic feedback controller 220 may be configured to execute another transition from the second touch-discernible output layout 418 to the first touch-discernible output layout 414. To execute the transition to the first touch-discernible output layout 414, the second circuitry 210 may be configured to re-calibrate the one or more of the plurality of different types of sensors 104 to receive sensor data in accordance with the first proximity range 402.

A mobility control signal may be sent by the assistive device 102 to the communication device 116 through the second communication network 108B to control the movement (for example, stop movement, reduce, or increase speed, change direction, or the like) of the target moving object 114. Thus, by use of the assistive device 102, the user 110 is able to non-visually track, non-visually discern the movement, and non-visually navigate (if needed) to the target moving object 114. For example, the target moving object 114 may be the child of the user 110, who is playing in a park. The user 110 may want to keep a watch (i.e., non-visually discern) on the activities of the child, while the child is playing. In such example, by use of the assistive device 102, the user 110 may be able keep a constant watch (i.e., non-visually discern) on the movement and activities of the child. Further, by the use of the assistive device 102, the user 110 may be able to instruct the child, possessing the communication device 116, to move slowly or stop moving. Furthermore, the assistive device 102 may provide navigation assistance in the form of audio feedback and/or the one or more haptic mobility signals to help the user 110 follow a path to reach his child.

In another example, the target moving object 114 may be a toy car of user's child which the child is riding. In such example, by use of the assistive device 102, the user 110 may be able keep a constant watch on the movement (for example, a current speed) of the toy car. Further, by the use of the assistive device 102, the user 110 may be able to remotely control the movement of the toy car, for example, the toy car may be coupled to the communication device 116 that receives that mobility control signal from the assistive device 102 for movement control.

In yet another example, the assistive device 102 may be used by the user 110 to non-visually experience a sport, for example, a soccer match. In this example, the target moving object 114 as selected by the user 110 may be a game equipment (e.g., a ball) being used in the game match. Thus, by use of the assistive device 102, the user 110 is able to non-visually track and non-visually discern the movement of the ball. The assistive device 102 may execute transition from the first touch-discernible output layout to the second touch-discernible output layout and from the second touch-discernible output layout to the first touch-discernible output layout as the ball continues to move during the game match, thus enabling the user 110 to non-visually experience the sport.

In FIG. 4B, the plurality of different haptic indicators example, are shown to be generated as a plurality of different protrusions of different shapes. However, the plurality of different haptic indicators may also be generated as different level of electric-pulses, different amount of pressure or pain, different level of temperature, or their combination, on the haptic feedback interface 112 by the haptic feedback generator 222, as described in FIG. 2A.

In conventional devices, the input section to receive a haptic input is different from the output section (in a conventional haptic user interface) where the Braille output or other tactile forms of output are generated. Typically, the input section to receive haptic input is a 6-keys or 8-keys Braille input. A separate section to receive input and provide output, may be considered a rudimentary form of HMI, where a generated haptic output may not be capable of receiving a further feedback on a particular touch-discernible haptic indicator. In contrast, the same tactile surface area of the haptic feedback interface 112 of the assistive device 102 acts both as the haptic input receiver and haptic output generator, where the user 110 may press a protrusion (or a bulge) generated on the haptic feedback interface 112 to provide the haptic input related to a specific object in the vicinity of the assistive device 102. Based on the amount of pressure exerted by the user 110 while touching the protrusion on the haptic feedback interface 112, the press may be considered a haptic input by the haptic feedback controller 220. Since the same tactile surface area of the haptic feedback interface 112 acts both as the haptic input receiver and haptic output generator, a size of the assistive device 102 is compact (for example, smaller) in comparison to the conventional devices where the input section to receive a haptic input is different from the output section. Compact size of the assistive device 102 enables easy handling by the user 110 who has lost or impaired sight.

Figure 5A:
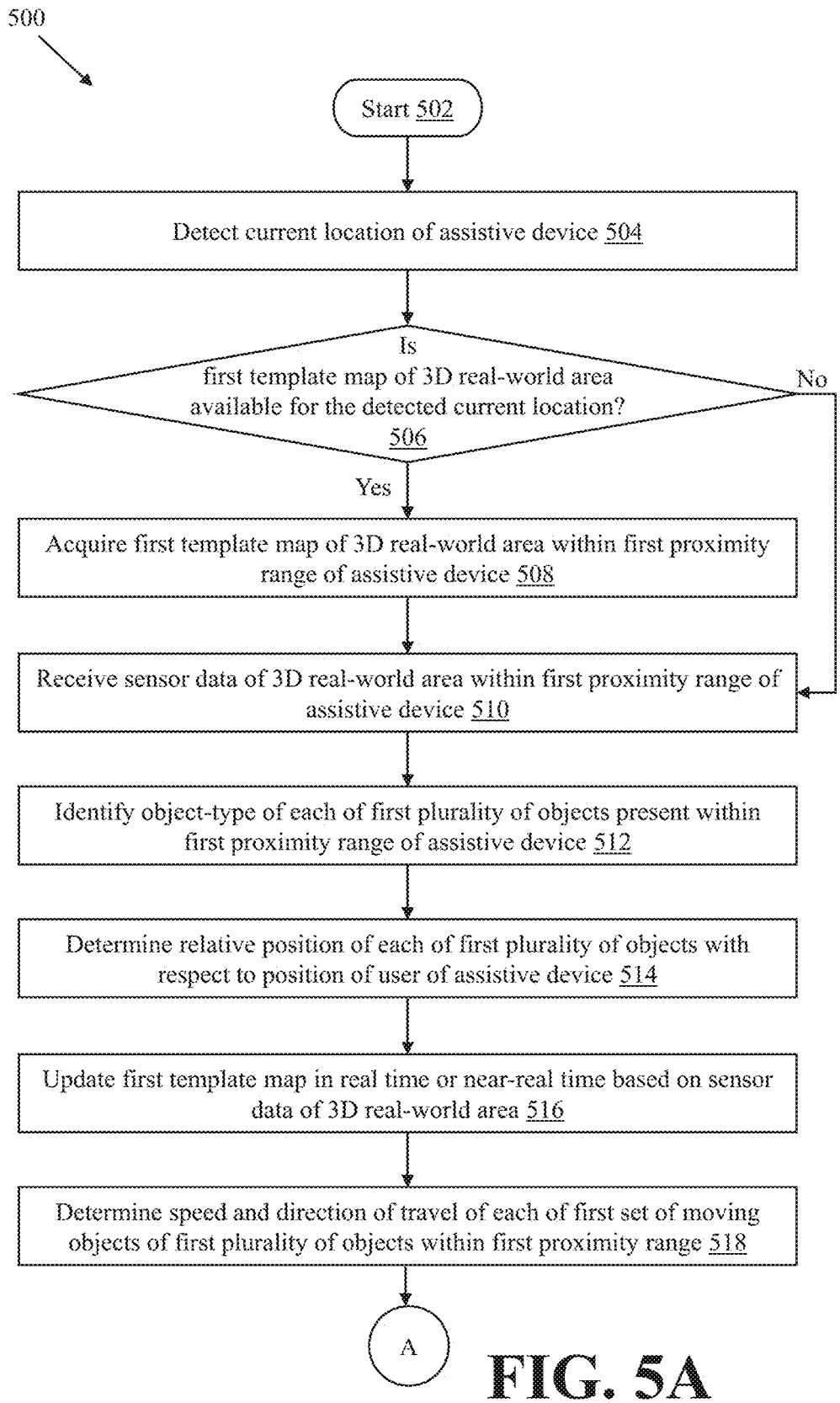
FIGS. 5A, 5B, 5C, and 5D, collectively, depict a flow chart that illustrates a method for providing non-visual assistance to a user to perceive surrounding world, in accordance with an embodiment of the disclosure.
Figure 5B:
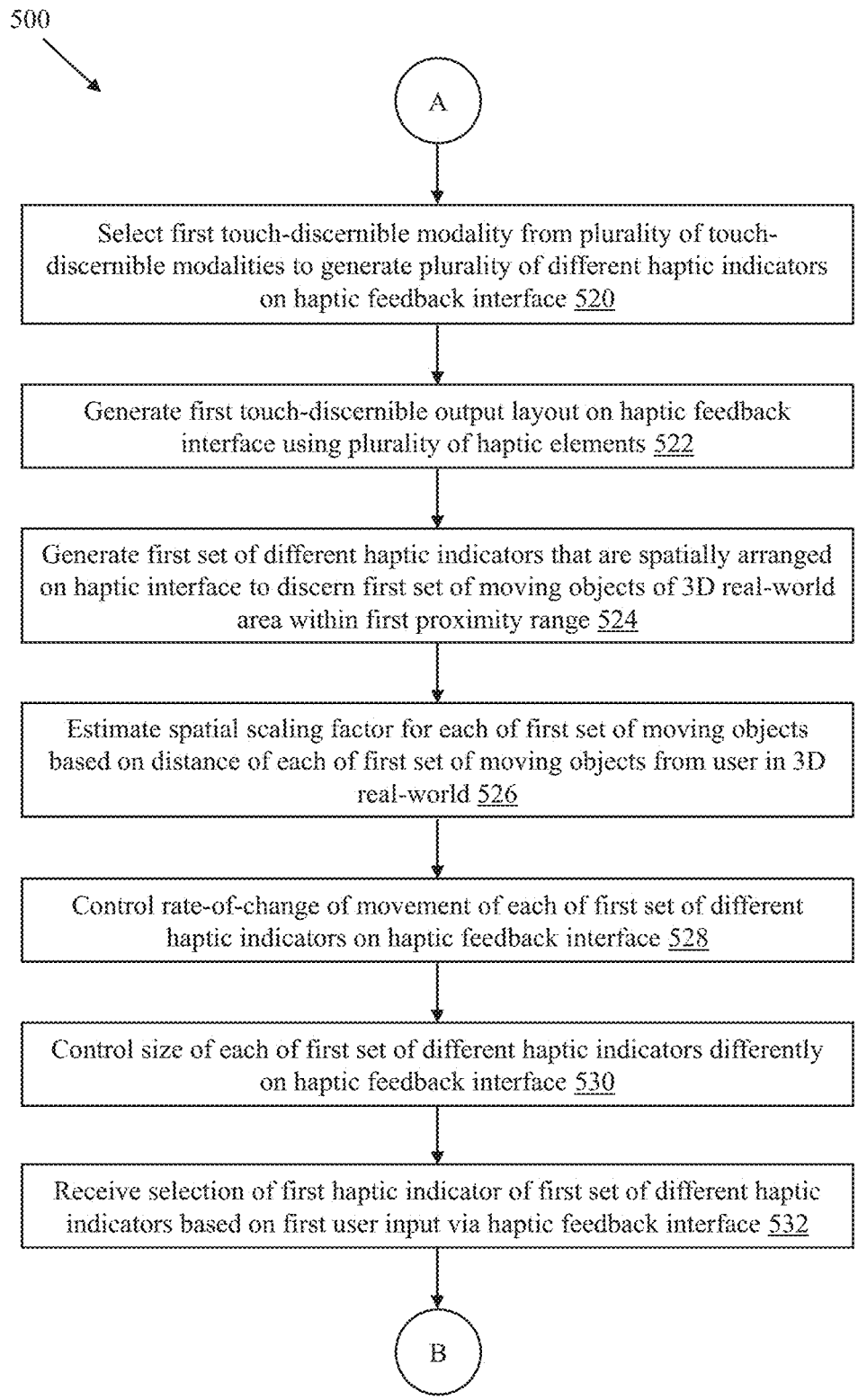
Figure 5C:
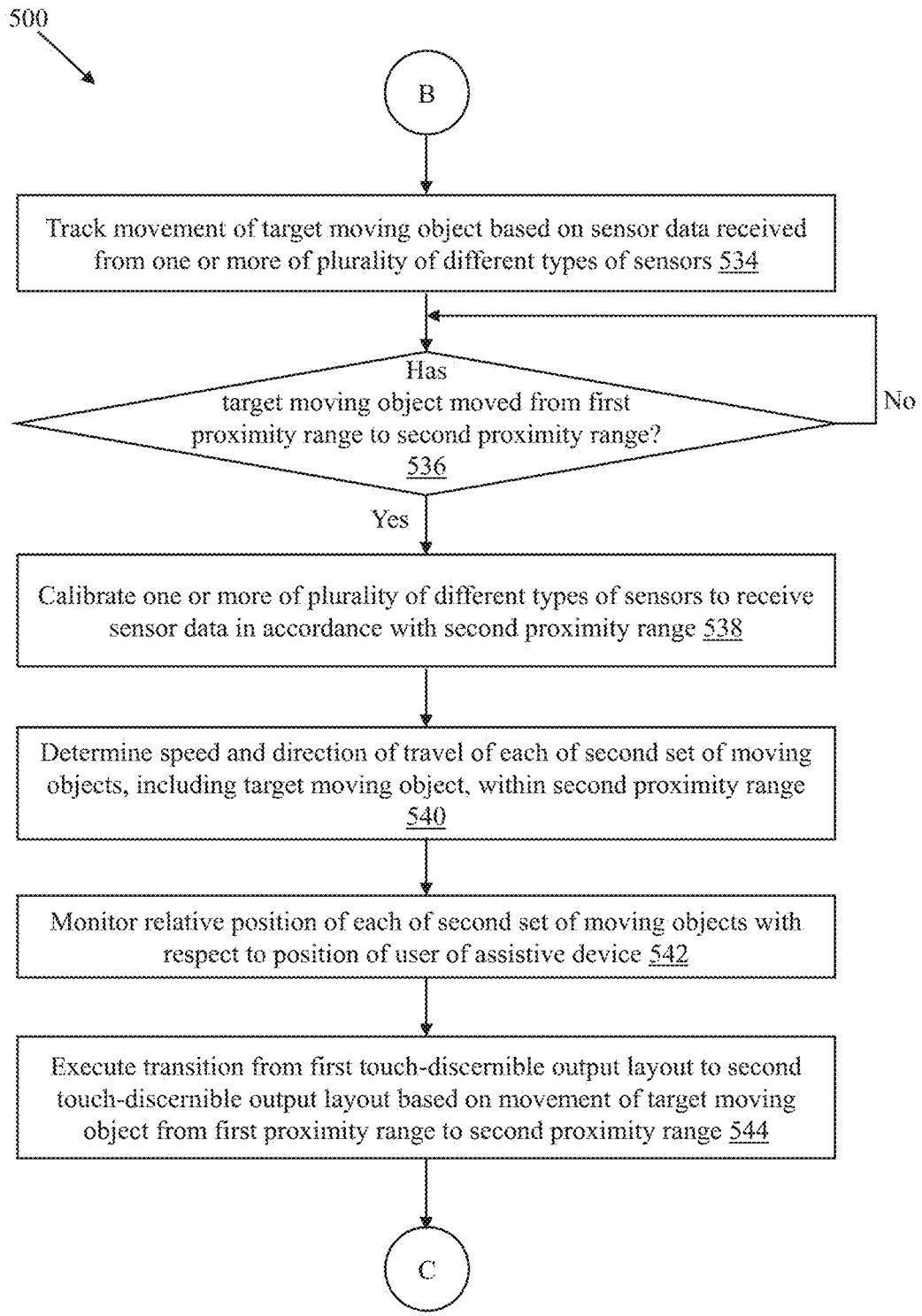
Figure 5D:
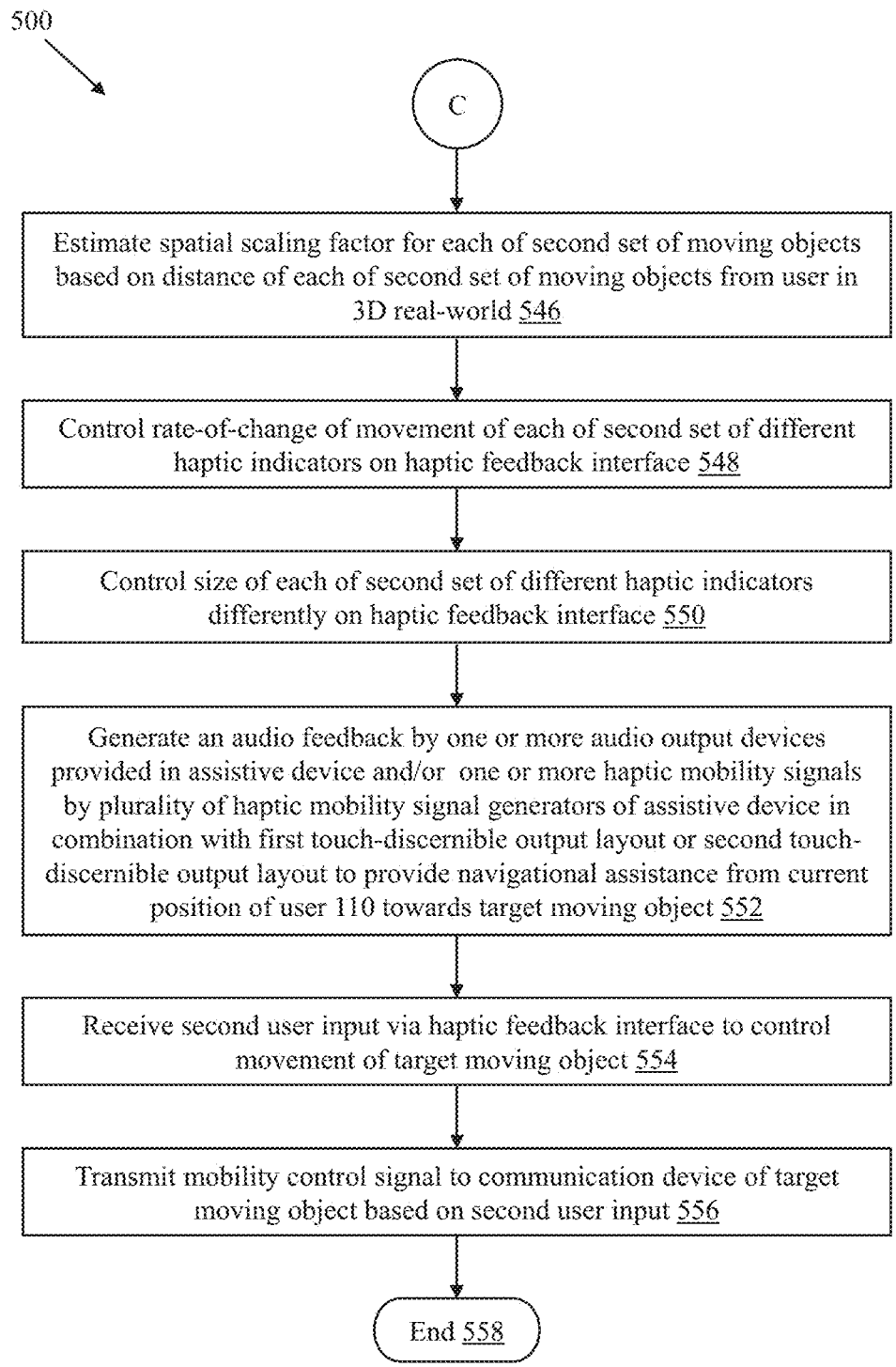

FIGS. 5A, 5B, 5C, and 5D, collectively, depict a flow chart 500 that illustrates a method for providing non-visual assistance to a user to perceive the surrounding world, in accordance with an embodiment of the disclosure. FIGS. 5A, 5B, 5C, and 5D are described in conjunction with elements from the FIGS. 1, 2A, 2B, 3, 4A, and 4B. As shown in FIG. 5A, the method of the flow chart 500 starts at 502 and proceeds to 504.

At 504, a current location of the assistive device 102 may be detected. The second circuitry 210 may be configured to detect the current location of the assistive device 102 using the location sensor. The location sensor may be provided in the sensor cluster unit 216 of the assistive device 102 or may refer to one of the plurality of different types of sensors 104.

At 506, it may be determined whether a first template map of a 3D real-world area for the detected current location of the assistive device 102 is available. The availability of the first template map of a 3D real-world area may be determined at the server 106 or the memory 212. In cases where the first template map is available, the control passes to 508, else to 510.

At 508, a first template map of a 3D real-world area within a first proximity range of the assistive device 102 may be acquired. The first circuitry 208 may be configured to acquire the first template map of the 3D real-world area within the first proximity range of the assistive device 102. In some embodiments, the first template map may be acquired from the server 106 based on the current location of the assistive device 102. As the user 110 may be equipped with the assistive device 102, the location of the assistive device 102 may be same as that of the user 110. In some embodiments, the memory 212 may store 2D/3D maps of geographical regions of the earth surface, such as street views for outdoor locations. In such embodiments, the first template map may be retrieved from the memory 212.

At 510, sensor data of the 3D real-world area within the first proximity range of the assistive device 102 may be received. The first circuitry 208 may be configured to receive the sensor data of the 3D real-world area within the first proximity range of the assistive device 102 from the plurality of different types of sensors 104 that are communicatively coupled to the assistive device 102. In some embodiments, the sensor data may also be received from the sensor cluster unit 216. In some embodiments, the first template map of a 3D real-world area may not be acquired, for example, in case of indoor locations or for regions where the first template map may not be available. In such a case, the sensor data of the 3D real-world area received in real time or near-real time may be used to collect information of the 3D real-world area within the first proximity range of the assistive device 102.

At 512, an object-type of each of a first plurality of objects present within the first proximity range of the assistive device 102 may be identified, based on the received sensor data. The second circuitry 210 may be further configured to identify the object-type of each of the first plurality of objects present within the first proximity range of the assistive device 102 based on the received sensor data. Examples of the object-type may include, but are not limited to a human being, an animal, a vehicle-type (such as a car, a truck, a bicycle, a two-wheeler, a four-wheeler, and the like), a living object, a non-living object, a moving object, a stationary object, a street, an obstacle, a hazard, a door, stairs, and other physical objects found in indoor or outdoor area of the 3D real-world area.

At 514, a relative position of each of the first plurality of objects with respect to the position of the user 110 of the assistive device 102 may be determined. The second circuitry 210 may be configured to determine the relative position of each of the first plurality of objects with respect to the position of the user 110 of the assistive device 102. The relative position of each of the first plurality of objects may be determined based on the sensor data received in real time or near-real time from the plurality of different types of sensors 104.

At 516, the first template map may be updated with at least positional information of the first plurality of objects, based on the received sensor data of the 3D real-world area within the first proximity range of the assistive device 102. The second circuitry 210 may be configured to update the first template map in real time or near-real time based on the sensor data of the 3D real-world area.

At 518, a speed and a direction of travel of each of a first set of moving objects of the first plurality of different objects within the first proximity range may be determined. The second circuitry 210 may be configured to determine the speed and the direction of travel of each of the first set of moving objects of the first plurality of objects within the first proximity range.

At 520, a first touch-discernible modality from a plurality of touch-discernible modalities may be selected to generate a plurality of different haptic indicators on the haptic feedback interface 112. The selection of the first touch-discernible modality may be based on learned user interaction information and a current weather condition in the 3D real-world area. The learned user interaction information may be determined based on a historical analysis of usage pattern data of the haptic feedback interface 112 by the learning engine provided in the memory 212. The plurality of touch-discernible modalities includes a differential pressure-based modality, a differential temperature-based modality, a differential electric pulse-based modality, a differential raised shape pattern-based modality. In some embodiments, a combination of different touch-discernible modalities may be selected based on the learned user interaction information, the current weather condition in the 3D real-world area, and a specified user-setting.

At 522, a first touch-discernible output layout may be generated on the haptic feedback interface 112 using the plurality of haptic elements 218. The haptic feedback controller 220 may be configured to generate the first touch-discernible output layout on the haptic feedback interface 112 using the plurality of haptic elements 218 and the haptic feedback generator 222. The first touch-discernible output layout may be generated using the selected first touch-discernible modality from the plurality of touch-discernible modalities. The first touch-discernible output layout may correspond to a first reproduction of the 3D real-world area within the first proximity range of the assistive device 102.

At 524, a first set of different haptic indicators that are spatially arranged on the haptic feedback interface 112 may be generated to discern the first set of moving objects of the 3D real-world area within the first proximity range. The first set of different haptic indicators may be generated on the haptic feedback interface 112 using the plurality of haptic elements 218. The haptic feedback controller 220 may be configured to generate at least the first set of different haptic indicators that are spatially arranged on the haptic feedback interface 112 to discern the first set of moving objects of the 3D real-world area within the first proximity range. The haptic feedback controller 220 may generate the first set of different haptic indicators on the haptic feedback interface 112 using the plurality of haptic elements 218 and the haptic feedback generator 222. The first touch-discernible output layout may include the generated first set of different haptic indicators. The first set of different haptic indicators may be spatially arranged on the haptic feedback interface 112 in a defined region such that a spatial arrangement of the first set of moving objects in the 3D real-world area within the first proximity range of the assistive device 102 is discernible by tactioception based on a user touch on the first touch-discernible output layout. The first touch-discernible output layout may also include a unique haptic indicator that corresponds to a position of the user 110 of the assistive device 102. The unique haptic indicator may be one of the first set of different haptic indicators generated on the haptic feedback interface 112. The unique haptic indicator may be indicative of a relative position of the user 110 with respect to each of the first set of moving objects and other static objects present in the 3D real-world area within the first proximity range of the assistive device 102.

At 526, a spatial scaling factor may be estimated for each of the first set of moving objects based on the distance of each of the first set of moving objects from the user 110 in the 3D real-world. The second circuitry 210 may be configured to estimate the spatial scaling factor based on the distance of each of the first set of moving objects from the user 110 in the 3D real-world.

At 528, a rate-of-change of movement of each of the first set of different haptic indicators may be controlled on the haptic feedback interface 112. The haptic feedback controller 220 may be configured to control the rate-of-change of movement based on the distance of each of the first set of moving objects from the user 110 and/or the spatial scaling factor determined for a corresponding moving object of the first set of moving objects. For example, in cases where a sighted user looks very far (e.g. beyond "X" meters) in the 3D real-world area, the changes, such as movement of objects, may appear slow as compared to when the sighted user looks nearby (i.e. up to "Y" meters). In cases where the sighted user looks nearby (e.g., Y=30 meters), the changes, such as movement of objects, appears to be very fast. Thus, in haptic domain, the first set of different haptic indicators that indicate moving objects requires to be controlled in accordance with the distance of each of the first set of moving objects from the user 110 for a realistic discerning of the 3D real-world area.

At 530, a size of each of the first set of different haptic indicators may be differently controlled on the haptic feedback interface 112. The haptic feedback controller 220 may be configured to differently control the size of each of the first set of different haptic indicators based on the distance of each of the first set of moving objects from the user 110 and/or the spatial scaling factor determined for a corresponding moving object of the first set of moving objects. For example, in cases where a sighted user looks very far (e.g., beyond "X" meters) in the 3D real-world area, the size of objects, may appear small as compared to when the sighted user looks nearby (i.e., up to "Y" meters). In cases where the sighted user looks nearby (e.g., Y=30 meters), the size of the same appears to be larger. Thus, in haptic domain, the size of the first set of different haptic indicators that indicate moving objects requires to be controlled in accordance with the distance of each of the first set of moving objects from the user 110 for a realistic discerning of the 3D real-world area.

At 532, a selection of a first haptic indicator of the first set of different haptic indicators may be received based on a first user input via the haptic feedback interface 112. The first haptic indicator may discern the movement of the target moving object 114 of the first set of moving objects and the selection of the first haptic indicator may correspond to a prompt to track the movement of the target moving object

114. The haptic feedback controller 220 may be configured to receive the selection of the first haptic indicator based on the first user input provided via the haptic feedback interface 112 to track the movement of the target moving object 114 discerned by the first haptic indicator.

At 534, the movement of the target moving object 114 may be tracked based on the sensor data received from one or more of the plurality of different types of sensor 104. The haptic feedback controller 220 may be configured to track the movement of the target moving object 114 based on the sensor data received in real time or near-real time from one or more of the plurality of different types of sensor 104.

At 536, it may be determined whether the target moving object 114 has moved from the first proximity range to the second proximity range using the sensor data of the plurality of different types of sensor 104. The haptic feedback controller 220 may be configured to determine whether the target moving object 114 has moved from the first proximity range to the second proximity range. In accordance with an embodiment, the first proximity range may be greater than the second proximity range. In accordance with an embodiment, the first proximity range may be smaller than the second proximity range. In cases where the target moving object 114 is still within the first proximity range, the control passes to 536, else to 538.

At 538, one or more of the plurality of different types of sensors 104 may be calibrated to receive sensor data in accordance with the second proximity range. The second circuitry 210 may be configured to calibrate the one or more of the plurality of different types of sensors 104 to receive sensor data in accordance with the second proximity range.

At 540, a speed and a direction of travel of each of a second set of moving objects, including the target moving object 114, within the second proximity range may be determined. The second circuitry 210 may be configured to determine the speed and the direction of travel of each of the second set of moving objects, including the target moving object 114, within the second proximity range.

At 542, a relative position of each of the second set of moving objects with respect to the position of the user 110 of the assistive device 102 may be monitored. The second circuitry 210 may be configured to monitor (or track) the relative position of each of the second set of moving objects with respect to the position of the user 110 of the assistive device 102. The relative position of each of the second set of moving objects may be monitored based on the sensor data of the second proximity range received in real time or near-real time from the plurality of different types of sensors 104.

At 544, a transition from the first touch-discernible output layout to a second touch-discernible output layout may be executed based on the movement of the target moving object 114 from the first proximity range to the second proximity range. The haptic feedback controller 220 may be configured to execute the transition from the first touch-discernible output layout to the second touch-discernible output layout. The second touch-discernible output layout may correspond to a second reproduction of the 3D real-world area based on the transition from the first proximity range to the second proximity range. In accordance with an embodiment, the second touch-discernible output layout may be a second 3D layout that comprises at least a second set of different haptic indicators. The second set of different haptic indicators may be spatially arranged on the haptic feedback interface 112 in the defined region such that a spatial arrangement of a second set of moving objects in the 3D real-world area within the second proximity range may be discernible by tactioception based on a user touch on the second touch-discernible output layout. The second set of different haptic indicators may include one or more haptic indicators of the first set of different haptic indicators and/or one or more new haptic indicators to discern movement of the second set of moving objects. The second set of moving objects may include one of more objects from the first set of moving objects and/or new objects detected within the second proximity range. The second touch-discernible output layout may also include the unique haptic indicator that corresponds to a current position of the user 110 of the assistive device 102 on the second touch-discernible output layout. The unique haptic indicator of the second set of different haptic indicators generated on the haptic feedback interface 112 may be indicative of a relative (or updated) position of the user 110 with respect to each of the second set of moving objects present in the 3D real-world area within the second proximity range of the assistive device 102.

At 546, a spatial scaling factor for each of the second set of moving objects may be estimated based on the distance of each of the second set of moving objects from the user 110 in the 3D real-world. The second circuitry 210 may be configured to estimate the spatial scaling factor based on the distance of each of the second set of moving objects from the user 110 in the 3D real-world.

At 548, a rate-of-change of movement of each of the second set of different haptic indicators may be controlled on the haptic feedback interface 112. The haptic feedback controller 220 may be configured to control the rate-of-change of movement based on the distance of each of the second set of moving objects from the user 110 and/or the spatial scaling factor determined for a corresponding moving object of the second set of moving objects.

At 550, a size of each of the second set of different haptic indicators may be controlled on the haptic feedback interface 112. The haptic feedback controller 220 may be configured to differently control the size based on the distance of each of the second set of moving objects from the user 110 and/or the spatial scaling factor determined for a corresponding moving object of the second set of moving objects.

At 552, at least one of an audio feedback may be generated by the one or more audio output devices 224 provided in the assistive device 102 or one or more haptic mobility signals by the plurality of haptic mobility signal generators of the assistive device 102 in combination with the first touch-discernible output layout or the second touch-discernible output layout to provide navigational assistance from a current position of the user 110 towards the target moving object 114. The haptic feedback controller 220 may be further configured to output at least one of the audio feedback by the one or more audio output devices 224 or the one or more haptic mobility signals in combination with the first touch-discernible output layout or the second touch-discernible output layout to provide navigational assistance from the current position of the user 110 towards the target moving object 114.

At 554, a second user input may be received via the haptic feedback interface 112 to control the movement of the target moving object 114. The haptic feedback controller 220 may be configured to receive the second user input via the haptic feedback interface 112 to remotely control the movement of the target moving object 114 in the 3D real-world.

At 556, a mobility control signal may be transmitted to the communication device 116 of the target moving object 114 based on the second user input via the haptic feedback interface 112. The first circuitry 208 may be configured to generate and transmit the mobility control signal to the communication device 116 of the target moving object 114 based on the second user input via the haptic feedback interface 112 to remotely control the movement of the target moving object 114. Control passes to end 558.

In accordance with an exemplary aspect of the disclosure, a system for providing non-visual assistance to a user (e.g., the user 110) to perceive the surrounding world is disclosed. The system may include the assistive device 102 (FIGS. 1, 2A, and 3), which may comprise the haptic feedback interface 112 (FIG. 1) comprising the plurality of haptic elements 218 (FIG. 2A). The assistive device 102 may further comprise the haptic feedback controller 220 configured to generate a first touch-discernible output layout on the haptic feedback interface 112 using the plurality of haptic elements 218. The first touch-discernible output layout may correspond to a first reproduction of a 3D real-world area within a first proximity range of the assistive device 102. The haptic feedback controller 220 configured to generate a first set of different haptic indicators that are spatially arranged on the haptic feedback interface 112 to discern a first set of moving objects of the 3D real-world area within the first proximity range such that the first touch-discernible output layout includes the first set of different haptic indicators. The haptic feedback controller 220 may be further configured to receive a selection of a first haptic indicator of the first set of different haptic indicators based on a first user input via the haptic feedback interface 112. The first haptic indicator discerns the target moving object 114 in the first set of moving objects. The haptic feedback controller 220 may be further configured to execute a transition from the first touch-discernible output layout to a second touch-discernible output layout based on a movement of the target moving object 114 from the first proximity range to a second proximity range of the assistive device 102. The second touch-discernible output layout may correspond to a second reproduction of the 3D real-world area within the second proximity range of the assistive device 102. The second touch-discernible output layout may include a second set of different haptic indicators that are spatially arranged on the haptic feedback interface 112 to discern movement of a second set of moving objects, including the target moving object 114, of the 3D real-world area within the second proximity range. The haptic feedback controller 220 may be further configured to control a rate-of-change of movement of each haptic indicator of the first set of different haptic indicators or the second set of different haptic indicators, based on a distance of a corresponding moving object in the 3D real-world from the user 110.

The present disclosure may be realized in hardware, or a combination of hardware and software. The present disclosure may be realized in a centralized fashion, in at least one computer system, or in a distributed fashion, where different elements may be spread across several interconnected computer systems or the special-purpose device. A computer system or other special-purpose apparatus adapted to carry out the methods described herein may be suited. The present disclosure may be realized in hardware that comprises a portion of an integrated circuit that also performs other functions.

The present disclosure may also be embedded in a computer program product, which comprises all the features that enable the implementation of the methods described herein, and which, when loaded in a special-purpose machine or computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An assistive device, comprising:
a haptic feedback interface that comprises a plurality of haptic elements; and
a haptic feedback controller configured to:
generate a first touch-discernible output layout on the haptic feedback interface using the plurality of haptic elements, wherein the first touch-discernible output layout corresponds to a first reproduction of a three-dimensional (3D) real-world area within a first proximity range of the assistive device;
generate a first set of different haptic indicators that are spatially arranged on the haptic feedback interface to discern a first set of moving objects of the 3D real-world area within the first proximity range, wherein the first touch-discernible output layout includes the first set of different haptic indicators;
receive a selection of a first haptic indicator of the first set of different haptic indicators based on a first user input via the haptic feedback interface, wherein the first haptic indicator discerns a target moving object in the first set of moving objects; and
execute a transition from the first touch-discernible output layout to a second touch-discernible output layout based on a movement of the target moving object from the first proximity range to a second proximity range of the assistive device, wherein the second touch-discernible output layout corresponds to a second reproduction of the 3D real-world area within the second proximity range of the assistive device, and wherein the second touch-discernible output layout includes a second set of different haptic indicators that are spatially arranged on the haptic feedback interface to discern movement of a second set of moving objects, including the target moving object, of the 3D real-world area within the second proximity range.

2. The assistive device according to claim 1, wherein the selection of the first haptic indicator corresponds to a prompt to track the movement of the target moving object in the 3D real-world area.

3. The assistive device according to claim 1, wherein the haptic feedback controller is further configured to track the movement of the target moving object in the 3D real-world area based on the received selection.

4. The assistive device according to claim 3, wherein, based on the tracked movement of the target moving object, the haptic feedback controller is further configured to output at least one of an audio feedback by one or more audio output devices provided in the assistive device or one or more haptic mobility signals in combination with the first touch-discernible output layout or the second touch-discernible output layout to provide navigational assistance from a current position of a user of the assistive device towards the target moving object.

5. The assistive device according to claim 1, further comprising a first circuitry configured to transmit a mobility control signal to a communication device of the target moving object based on a second user input via the haptic feedback interface, wherein a user of the assistive device controls the movement of the target moving object by the mobility control signal.

6. The assistive device according to claim 1, wherein the haptic feedback controller is further configured to differently control a rate-of-change of movement of each of the first set of different haptic indicators on the haptic feedback interface based on a distance of each of the first set of moving objects present in the 3D real-world from a user of the assistive device.

7. The assistive device according to claim 6, further comprising a second circuitry configured to determine a spatial scaling factor for each of the first set of moving objects present in the 3D real-world based on the distance of each of the first set of moving objects from the user of the assistive device, wherein the rate-of-change of movement of each of the first set of different haptic indicators is controlled in accordance with the spatial scaling factor determined for a corresponding moving object of the first set of moving objects.

8. The assistive device according to claim 1, wherein the haptic feedback controller is further configured to differently control a rate-of-change of movement of each of the second set of haptic indicators on the haptic feedback interface based on a distance of each of the second set of moving objects present in the 3D real-world from a user of the assistive device.

9. The assistive device according to claim 8, further comprising a second circuitry configured to determine a spatial scaling factor for each of the second set of moving objects present in the 3D real-world based on the distance of each of the second set of moving objects from the user of the assistive device, wherein the rate-of-change of movement of each of the second set of haptic indicators is controlled in accordance with the spatial scaling factor determined for a corresponding moving object of the second set of moving objects.

10. The assistive device according to claim 1, wherein the haptic feedback controller is further configured to differently control a size of each of the first set of different haptic indicators on the haptic feedback interface based on a distance of each of the first set of moving objects present in the 3D real-world from a user of the assistive device.

11. The assistive device according to claim 1, wherein the first haptic indicator has a first size in the first touch-discernible output layout and a second size in the second touch-discernible output layout, and wherein the first size is different from the second size.

12. The assistive device according to claim 1, wherein the first proximity range is greater than the second proximity range.

13. The assistive device according to claim 1, wherein the first proximity range is smaller than the second proximity range.

14. The assistive device according to claim 1, wherein the first touch-discernible output layout further includes a unique haptic indicator in combination with the first set of different haptic indicators, and wherein the unique haptic indicator discerns a relative position of a user of the assistive device with respect to each of the first set of moving objects present in the 3D real-world area within the first proximity range of the assistive device.

15. The assistive device according to claim 1, wherein the second touch-discernible output layout further includes a unique haptic indicator in combination with the second set of different haptic indicators, and wherein the unique haptic indicator discerns a relative position of a user of the assistive device with respect to each of the second set of moving objects present in the 3D real-world area within the second proximity range of the assistive device.

16. The assistive device according to claim 1, wherein the first set of different haptic indicators and the second set of different haptic indicators are generated by a touch-discernible modality that includes at least one of a differential pressure-based modality, a differential temperature-based modality, a differential electric pulse-based modality, a differential raised shape pattern-based modality, or a combination of different touch-discernible modalities.

17. An assistive method, comprising:
in an assistive device that comprises a haptic feedback controller and a haptic feedback interface that includes a plurality of haptic elements:
generating, by the haptic feedback controller, a first touch-discernible output layout on the haptic feedback interface using the plurality of haptic elements, wherein the first touch-discernible output layout corresponds to a first reproduction of a three-dimensional (3D) real-world area within a first proximity range of the assistive device;
generating, by the haptic feedback controller, a first set of different haptic indicators that are spatially arranged on the haptic feedback interface to discern a first set of moving objects of the 3D real-world area within the first proximity range, wherein the first touch-discernible output layout includes the first set of different haptic indicators;
receiving, by the haptic feedback controller, a selection of a first haptic indicator of the first set of different haptic indicators based on a first user input via the haptic feedback interface, wherein the first haptic indicator discerns a target moving object in the first set of moving objects; and
executing, by the haptic feedback controller, a transition from the first touch-discernible output layout to a second touch-discernible output layout based on a movement of the target moving object from the first proximity range to a second proximity range of the assistive device, wherein the second touch-discernible output layout corresponds to a second reproduction of the 3D real-world area within the second proximity range of the assistive device, and wherein the second touch-discernible output layout includes a second set of different haptic indicators that are spatially arranged on the haptic feedback interface to discern movement of a second set of moving objects, including the target moving object, of the 3D real-world area within the second proximity range.

18. The assistive method according to claim 17, further comprising tracking, by the haptic feedback controller, the movement of the target moving object in the 3D real-world area based on the received selection.

19. The assistive method according to claim 17, further comprising differently controlling, by the haptic feedback controller, a rate-of-change of movement of each of the first set of different haptic indicators on the haptic feedback interface based on a distance of each of the first set of moving objects present in the 3D real-world from a user of the assistive device.

20. The assistive method according to claim 17, further comprising differently controlling, by the haptic feedback controller, a shape and a size of each of the first set of different haptic indicators on the haptic feedback interface based on a distance of each of the first set of moving objects present in the 3D real-world from a user of the assistive device.

* * * * *